Figure 1:
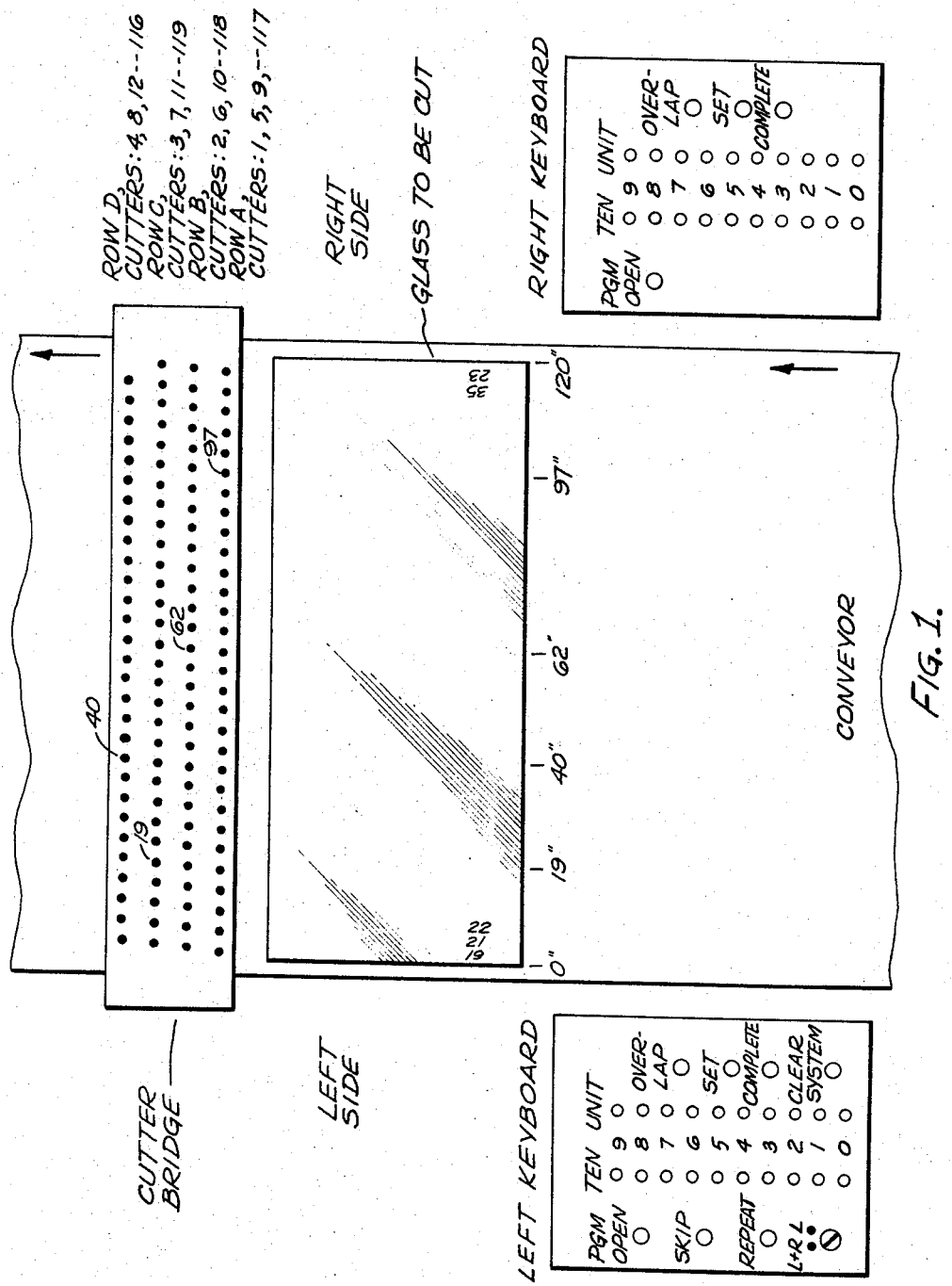

Sept. 26, 1967 W. D. COCKRELL 3,343,436
CONTROL MEANS FOR SEQUENCING A PLURALITY
OF GLASS SCORING MEANS
Filed Dec. 28, 1962 15 Sheets-Sheet 1

INVENTOR.
WILLIAM D. COCKRELL
BY James J. Williams
HIS ATTORNEY

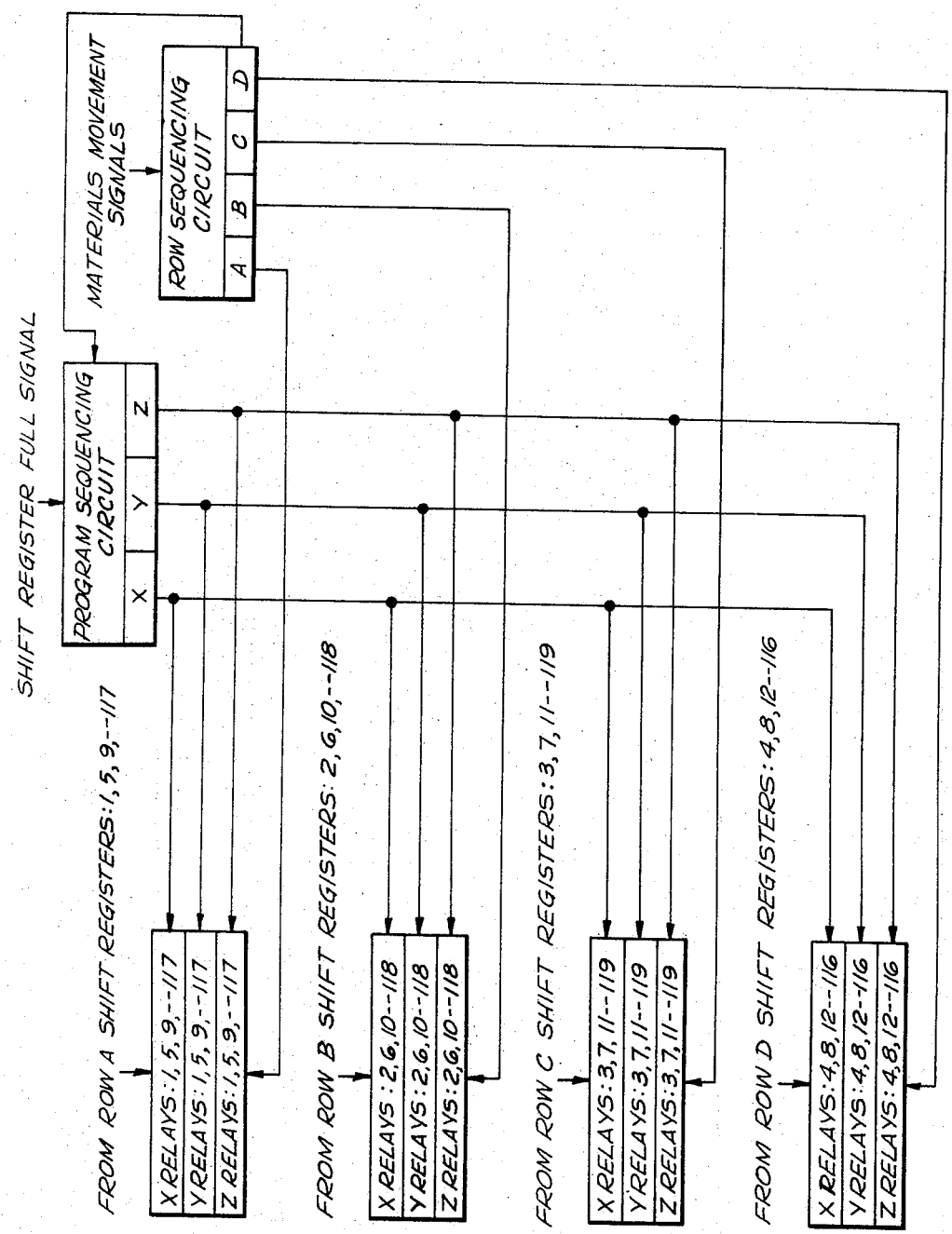

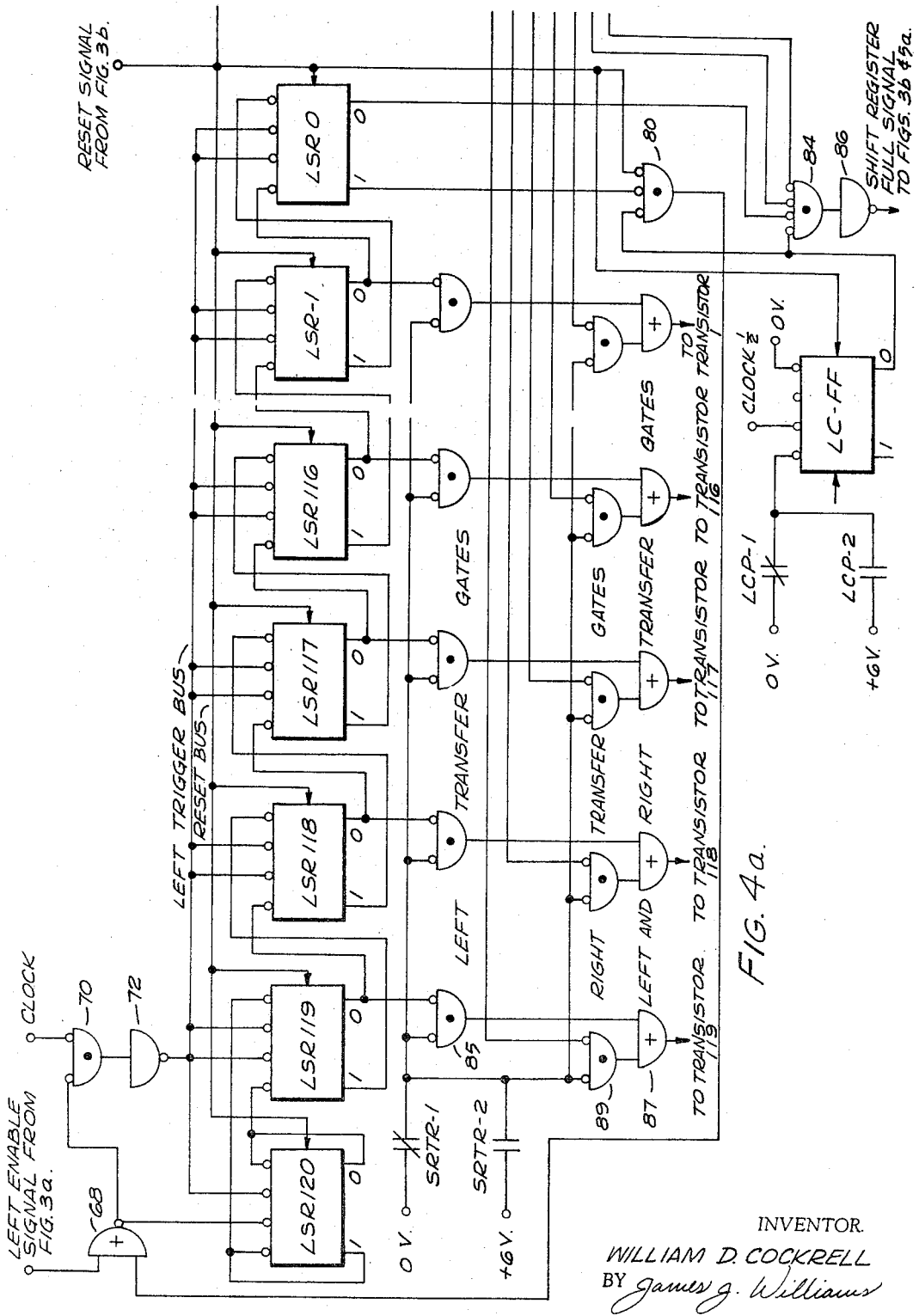

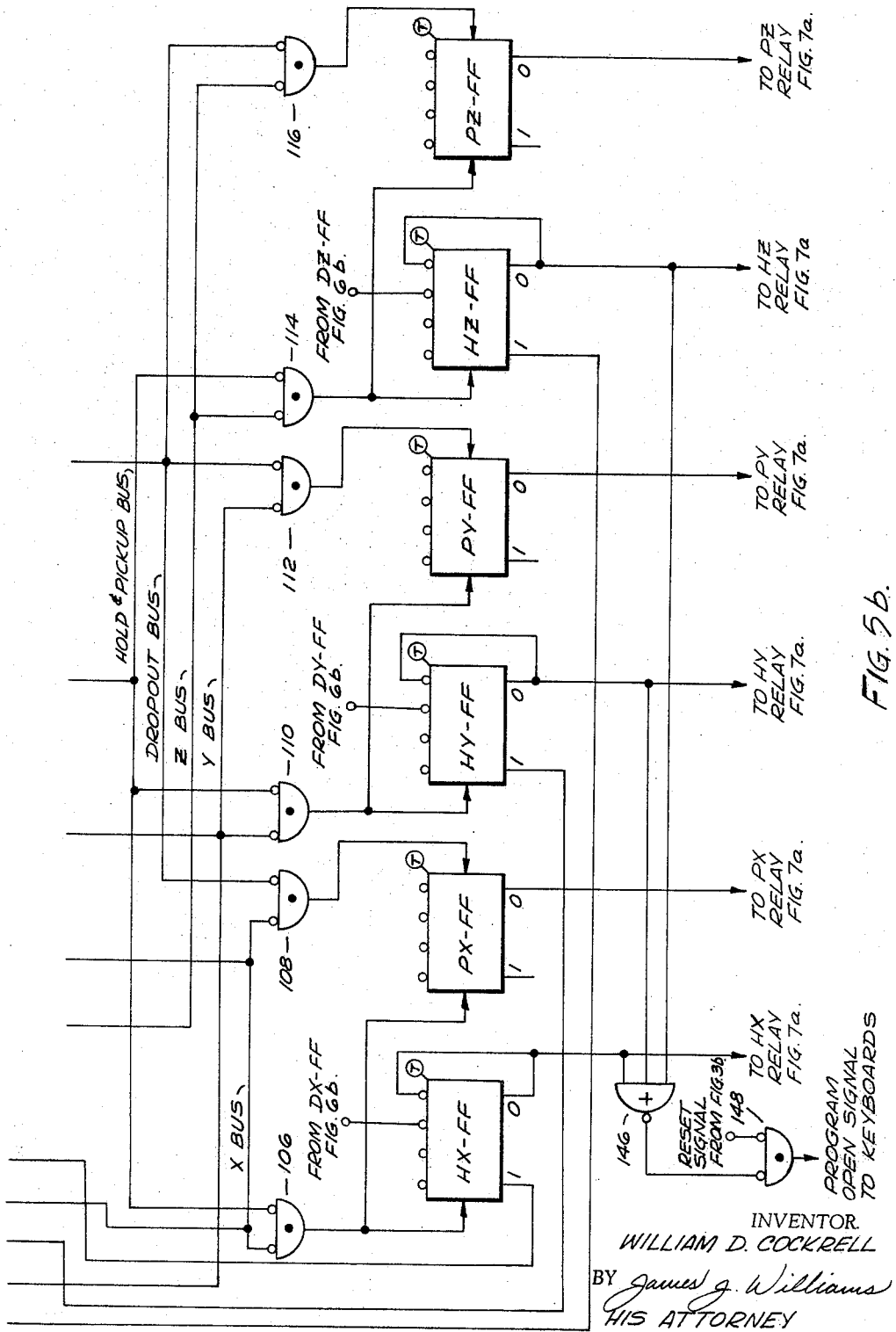

Sept. 26, 1967 W. D. COCKRELL 3,343,436
CONTROL MEANS FOR SEQUENCING A PLURALITY
OF GLASS SCORING MEANS
Filed Dec. 28, 1962 15 Sheets-Sheet 13

INVENTOR.
WILLIAM D. COCKRELL
BY James J. Williams
HIS ATTORNEY

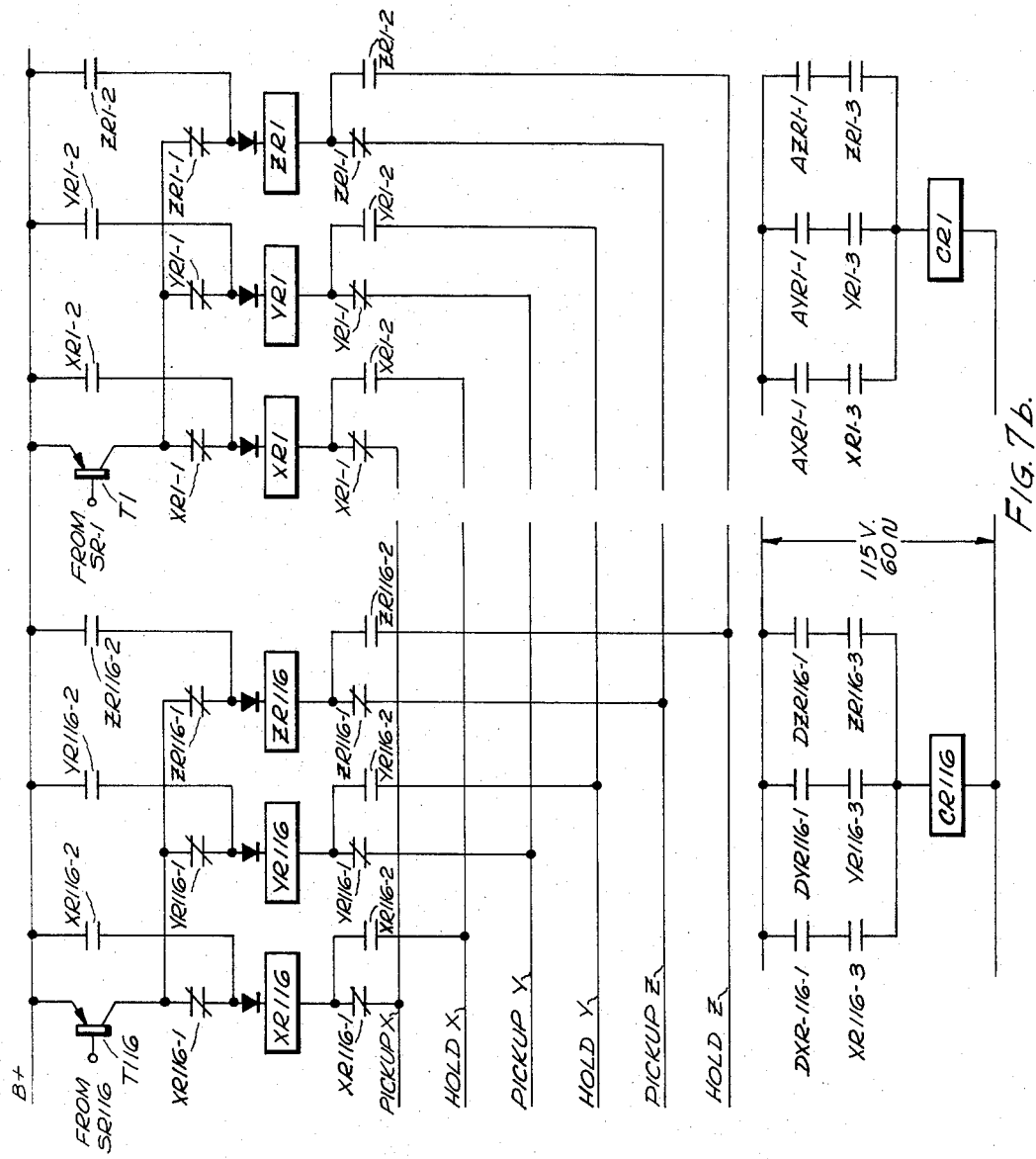

|  | RESET SR & SET SCDC | TRF 120 TO SCDC | SET RLO-FF | SET DC | TRF KYBD TO DC | COUNT DC & ENABLE |
|---|---|---|---|---|---|---|
|  | SET DC | TRF KYBD TO DC | COUNT DC & SCDC |  |  |  |
| ΔC1-FF | SET | SET | RESET | SET | SET | RESET |
| ΔC2-FF | RESET | SET | SET | RESET | SET | SET |
| ΔC3-FF | RESET | RESET | RESET | SET | SET | SET |

(First three columns: ON FIRST L or R SET OF NEW PGM.)

FIG. 8a.

|  | PGM X USED | PGM Y USED | PGM Z USED |
|---|---|---|---|
| PGM-FF1 | SET | RESET | RESET |
| PGM-FF2 | RESET | SET | RESET |

FIG. 8b.

|  | RESET STATE | ENERGIZE HOLD & PICKUP RELAYS | ENERGIZE SHIFT REGISTER TRF RELAY | DE-ENERGIZE PICKUP & SHIFT REGISTER TRF RELAYS |
|---|---|---|---|---|
| SQ-FF1 | RESET | SET | SET | RESET |
| SQ-FF2 | RESET | RESET | SET | SET |

FIG. 8c.

|  | PGM X USED | PGM Y USED | PGM Z USED |
|---|---|---|---|
| ROW-FF1 | SET | RESET | RESET |
| ROW-FF2 | RESET | SET | RESET |

FIG. 8d.

United States Patent Office 3,343,436
Patented Sept. 26, 1967

3,343,436
CONTROL MEANS FOR SEQUENCING A PLURALITY OF GLASS SCORING MEANS
William D. Cockrell, Waynesboro, Va., assignor to General Electric Company, a corporation of New York
Filed Dec. 28, 1962, Ser. No. 247,968
16 Claims. (Cl. 83—11)

The invention relates to a control system, and particularly to a control system for selectively operating devices in programmed sequence and in a material movement sequence.

The control system of the invention was made for a glass cutting operation. However, the control system may be used in other applications. In the glass cutting operation for which the invention was conceived, large sheets of moving glass on a conveyor are to be cut along lines parallel to their direction of movement into smaller width sheets. This cutting is done by a number of cutters which are located above the glass, which are moved down against the surface of the glass, and which scribe the glass as it moves under the cutter. The cutters are positioned at one inch intervals along a line transverse to the direction of motion of the glass (i.e., along the width), and any of the cutters are to be selected and operated in accordance with a program. There is one program for each large sheet of glass. The particular cutters are selected in accordance with the desired widths of glass to be cut from the one large sheet of glass. These widths are marked on the large sheet of glass by inspectors who examine the glass as it moves by. The inspectors know the desired widths needed and mark these widths on the moving sheet of glass. The marked sheets of glass then pass by operators who operate the cutters in accordance with the marked widths. Since there may be an operator on each side of the conveyor, the control system prevents any conflict or overlap which may result from a program where one operator operates a cutter which would cut the glass along a line within an area selected by the other operator. As the glass passes under the operated cutters, its surface is scribed. The glass is then broken along these scribed lines to form the desired smaller widths of glass. Since the conveyor carries a large number of the large sheets separated by a small distance, the control system must contain a number of programs of information. Each of these programs indicates the particular cutters to be operated for a given sheet of glass. As soon as the cutters are operated and scribe a sheet of glass, a new program is to be immediately available to operate the cutters for the following sheet of glass. Since the cutters are to be at one inch intervals along a line transverse to the direction of motion of the glass, it is necessary to stagger the cutters in rows to accommodate them within the available area. Therefore, it is necessary that the rows of cutters be sequenced in accordance with the presence of each sheet of glass.

Accordingly, an object of the invention is to provide an improved control system for operating selectable devices in a programmed sequence.

Another object of the invention is to provide an improved control system for operating selectable devices in a programmed sequence and also in a motion or row sequence.

Another object of the invention is to provide a control system that operates selectable devices in a programmed sequence and in a row sequence responsive to the relative movement of an object and the selectable devices.

Another object of the invention is to provide a control system for operating selectable devices which operate on or modify objects moving on a conveyor.

Another object of the invention is to provide a control system for operating devices which operate on or modify moving material, these devices being operated in a controlled programmed sequence and being operated in a row sequence responsive to movement of the material.

Briefly, in accordance with the invention, one or more input devices are provided for receiving input information indicative of the cutters to be operated. This information is applied to a checking circuit which compares the information with predetermined information to make sure that there is no conflict or overlap. If there is no conflict or overlap, the information is passed along to information storage devices. These storage devices receive and hold the information until all input information for one sheet of glass (i.e., in one program) is stored. This input information in the information storage devices is then transferred to one of a plurality of program groups of information storage devices. The information storage devices are then available for further input information. The program groups are selected in accordance with a program sequence. This information is then transferred to the cutters in a cutter row sequence. For a given program, the information is applied to the various cutter rows as the sheet of glass passes under the cutters so that any selected cutter is operated ahead of the sheet of glass, and remains operated until the sheet of glass passes. Each of the cutters rows becomes available to a new program of information which is waiting in one of the program groups of information storage devices. The control system also permits a sheet of glass to pass by without being cut and still retain all of the programmed information in the information storage devices. The system may also repeat a given program as many times as desired. Finally, the system also includes other features which are desirable in the glass cutting operation.

Figure 2A:
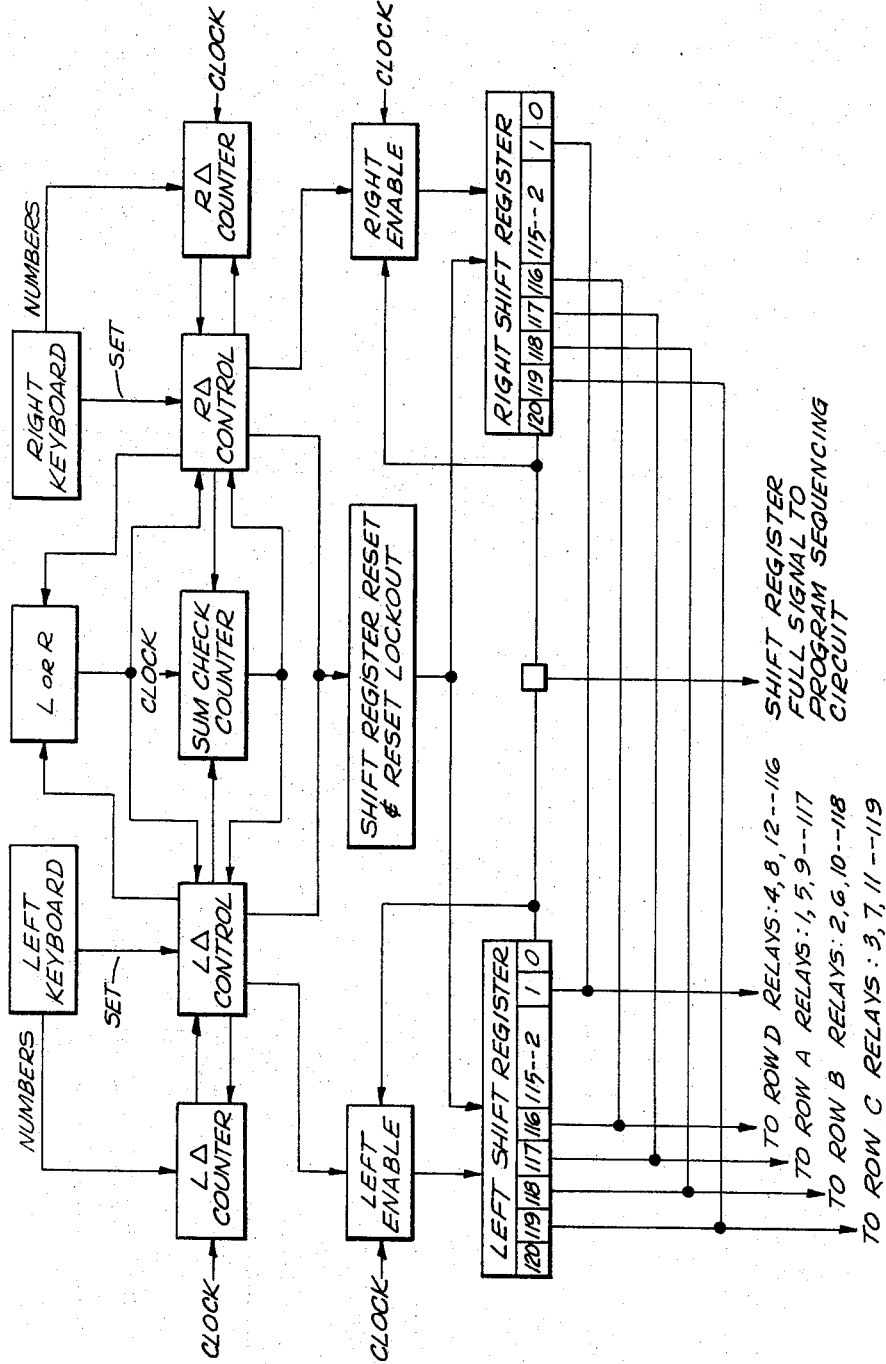
Figure 3A:
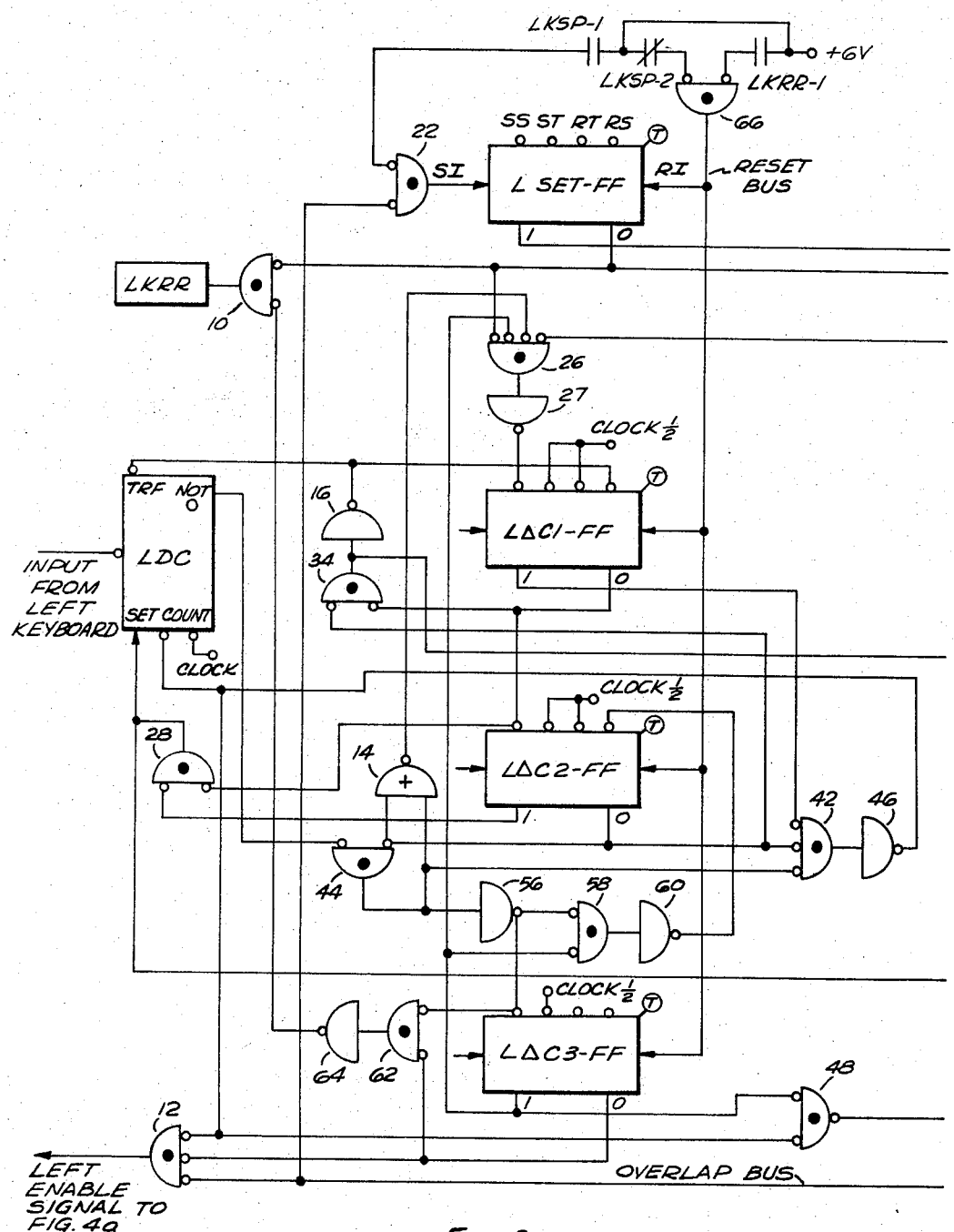

The invention is particularly pointed out and distinctly claimed in the claims. The invention, its structure, its operation, and further objects and advantages may be better understood by reference to the following description taken in connection with the accompanying drawing, in which:

FIGURE 1 shows a plan view of a conveyor for the glass to be cut, the cutters for cutting the glass, and the operators' keyboards;

FIGURES 2a and b show a block diagram of the control system of the invention;

FIGURES 3a, b, and c show the input logic circuitry of the control system of the invention;

FIGURES 4a and b show the shift register storage circuits of the control system of the invention.

Figure 5A:
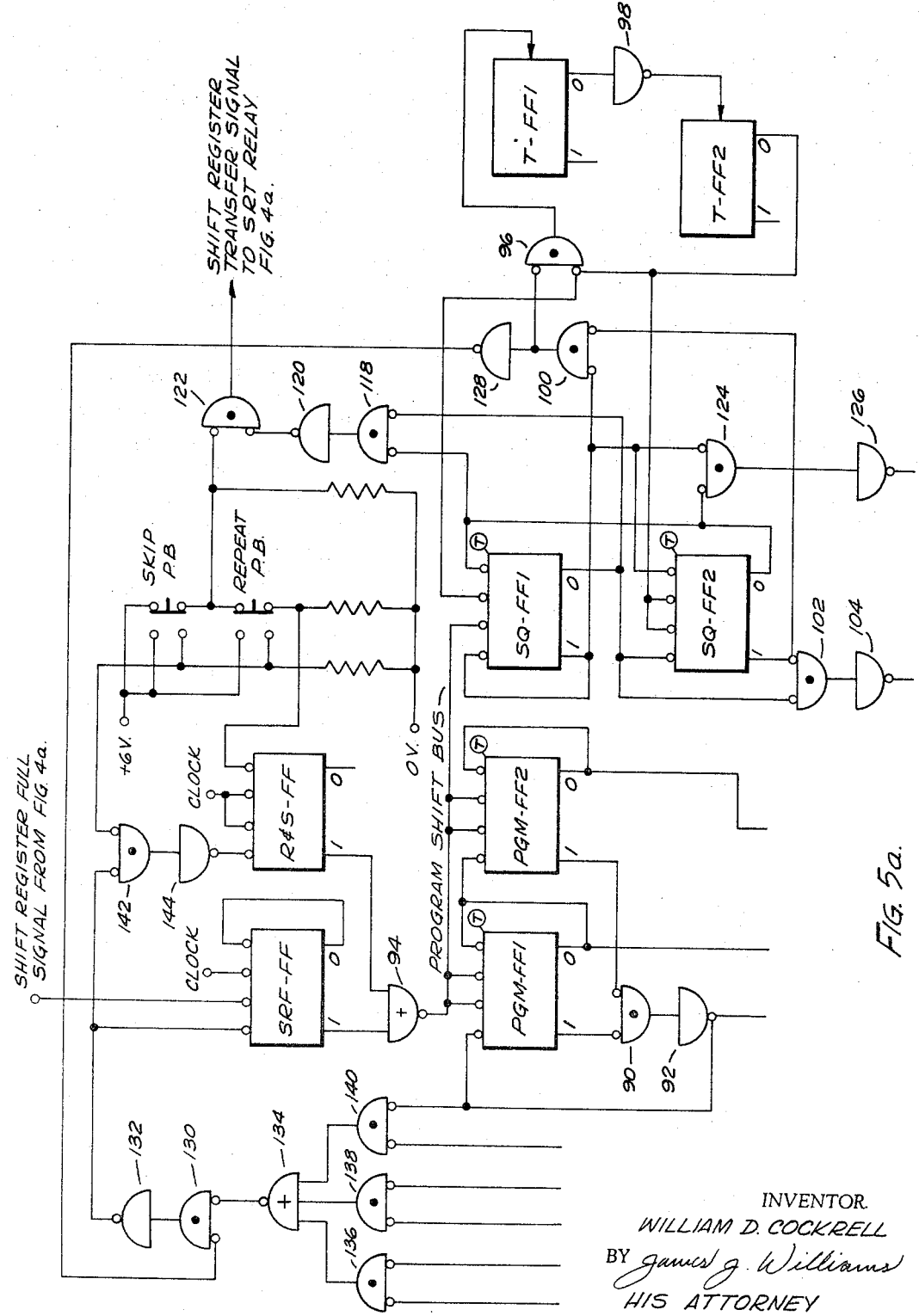
Figure 6A:
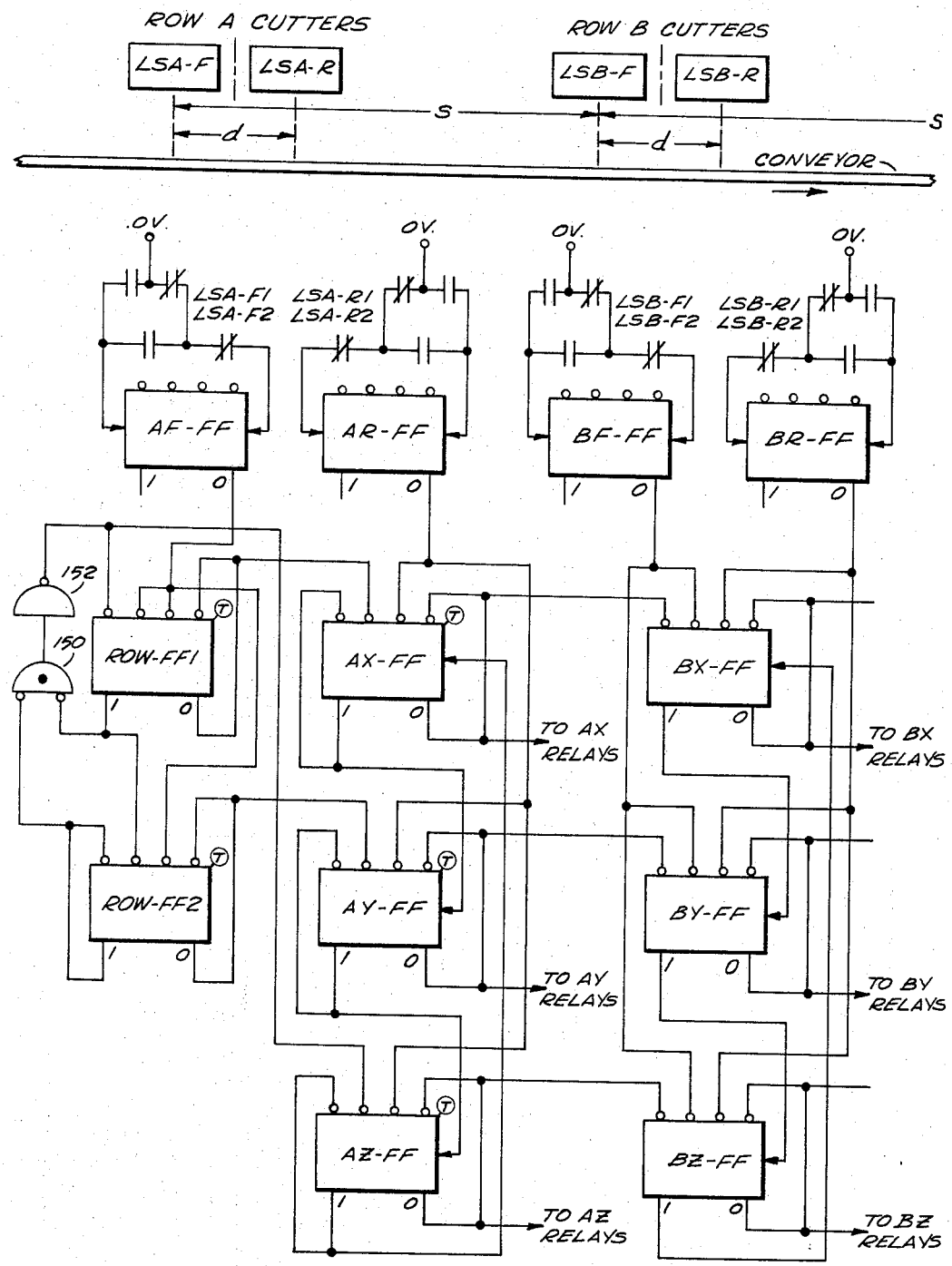
Figure 7A:
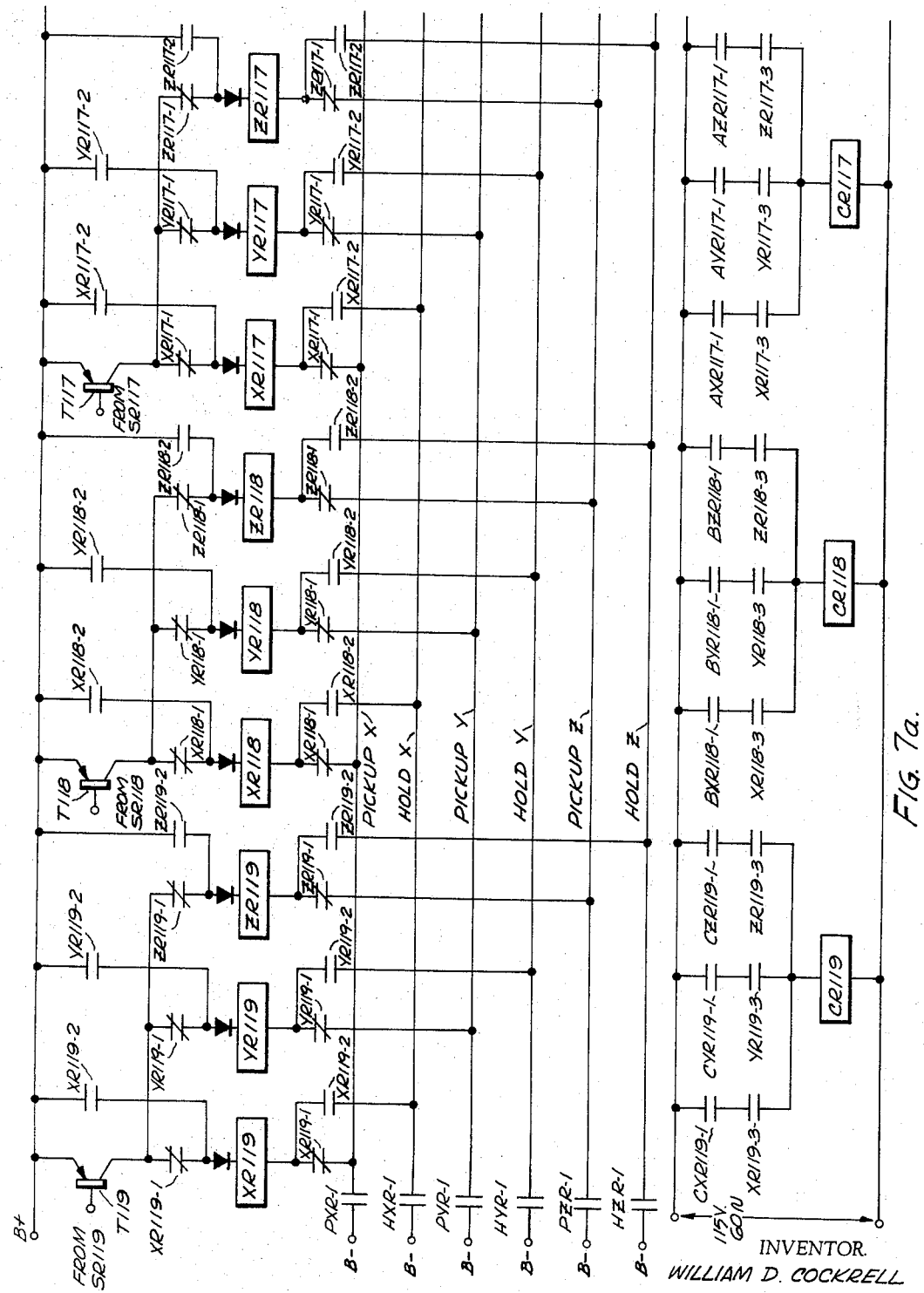

FIGURES 5a and b show the program sequencing circuit of the control system of the invention;

FIGURES 6a and b show the row sequencing circuit of the control system of the invention;

FIGURES 7a and b show the cutter operating relay circuits of the control system of the invention; and FIGURES 8a, b, c, and d show logic tables for explaining the operation of certain of the circuits.

In the specification, a brief description of the control system of the invention will first be given. Next, a brief explanation of the logic circuits used in the control system will be given. Finally, a relatively complete description of the various circuits of the control system will be given. This complete description will include an example of operation that will assist in understanding the operation of the control system.

*Brief description*

The control system of the invention was made for use with a conveyor which carries large sheets of glass to be cut into smaller widths at selectable one inch intervals.

FIGURE 1 shows such a conveyor carrying one large sheet of glass to be cut. In the particular application for which the invention was made, these sheets of glass have a width (i.e., a dimension transverse to the direction of motion) of 120 inches as indicated. The glass is carried by the conveyor in the direction indicated and passes under a cutter bridge which contains four cutter rows A, B, C, and D. Row A contains 30 cutters respectively positioned at 1, 5, 9—117 inches from the left side. Row B contains 30 cutters respectively positioned at 2, 6, 10—118 inches from the left side. Row C contains 30 cutters respectively positioned at 3, 7, 11—119 inches from the left side. And row D contains 29 cutters respectively positioned at 4, 8, 12—116 inches from the left side. These cutters had to be arranged in the four rows A, B, C, and D because their physical size was too great to permit them to be positioned at one inch intervals in a single row. When the cutters are operated, a point is moved down to a position such that, as the glass passes the operated cutter, it is scribed. The scribed glass is then broken along the line or scribe.

Before the glass reaches the position shown in FIGURE 1, it passes by inspectors who know the desired widths of glass to be cut from the large 120 inch width, and who examine the glass for flaws or defects. After examining the glass, and knowing the desired widths, these inspectors write dimensions on the glass on their respective sides. A typical example of such dimensions is indicated on the glass. This example is used subsequently to explain the control system. At this point, it should merely be noted that the dimensions written on the glass are in the order from the respective sides of the glass that the cuts are to be made. Thus, from the left side of the glass, a 19 inch piece is to be cut, a 21 inch piece is to be cut, and a 22 inch piece is to be cut. This uses the left 62 inches of the glass. From the right side, a 23-inch piece is to be cut, and a 35-inch piece is to be cut. This utilizes the right 58 inches of the glass.

The operators' left and right keyboards are positioned on respective sides of the conveyor. For convenience, the left operator is considered the master operator and his keyboard is provided with certain additional functions. Each keyboard includes tens and units columns of pushbuttons from 0 through 9 for selecting the desired dimensions. Each keyboard also includes a program open light, an overlap light, a set pushbutton, and a complete pushbutton. The left keyboard also includes a system clear pushbutton, a skip pushbutton, a repeat pushbutton, and a left-and-right or a left only keyboard control. These features will be explained subsequently.

FIGURES 2a and b show a block diagram of the control system in accordance with the invention and as utilized in the application shown in FIGURE 1. Since the control system may be used by two operators, there is some duplication of left and right elements. Assume the left operator wishes to enter the number 19. He pushes the 1 pushbutton in the tens column and the 9 pushbutton in the units column. He depresses his set pushbutton which disables the right elements by the L or R circuit, which enters the number 19 in his L$\Delta$ counter, and which enters the number 120 in the sum check counter. Then, the L$\Delta$ counter and the sum check counter simultaneously count clock pulses from some source, such as a ten kilocycle oscillator. The L$\Delta$, the R$\Delta$, and the sum check counters are down counters which, for each clock pulse, reduce the counter or numbers inserted in them by one. These counters produce a signal when their count is reduced to zero. When the L$\Delta$ counter has received 19 clock pulses, it produces a signal which is applied to the L$\Delta$ control. The L$\Delta$ control stops the counters from further counting. At this point, the sum check counter has its count of 120 reduced by 19, so that it has a count of 101. If the sum check counter does not have its initial count of 120 reduced to zero, the sequence is repeated. The number 19 is again entered in the L$\Delta$ counter. However, this time the L$\Delta$ control (through a left enable circuit) permits clock pulses to be applied to the L$\Delta$ counter and the left shift register, but not to the sum check counter. The shift registers each contain 121 flip-flops, there being one flip-flop for each one inch interval from 0 to 120 inclusive. The left shift register is provided with an index signal in its flip-flop 120, and the right shift register is provided with an index signal at its flip-flop 0. When the shift registers receive clock pulses, the index signal in the left shift register moves one flip-flop per clock pulse toward flip-flop 0, and the index signal in the right shift register moves one flip-flop per clock pulse toward flip-flop 120. In the example, as soon as the count of 19 in the L$\Delta$ counter is reduced to zero for the second time, the L$\Delta$ control stops the index signal from moving through the left shift register. The index signal is in flip-flop 101 (120 minus 19) of the left shift register. Additional numbers may be similarly entered as index signals in the left or right shift register until the sum check counter has its initial count of 120 reduced to 0.

When both operators have entered and set their respective numbers in the keyboards, the operators then respectively depress their complete pushbuttons. This serves to move the initial index signal (as well as any subsequent index signals) in the left shift register down to the flip-flop 0 and to move the initial index signal (as well as any subsequent index signals) in the right shift register to the flip-flop 120. When these initial index signals respectively reach the flip-flop 0 and the flip-flop 120, movement of the index signals through the shift registers is halted. At this time, the left shift register contains the initial index signal in the flip-flop 0, and the subsequent index signals in subsequent flip-flops. The right shift register contains the initial index signal in the flip-flop 120 and the subsequent index signals in subsequent flip-flops.

The initial index signals in the flip-flop 0 and the flip-flop 120 are used to provide a shift register full signal for the program sequencing circuit shown in FIGURE 2b. The program sequencing circuit makes one of the three programs, X or Y or Z, available to the left and right shift registers. The programs sequencing circuit respectively energizes the X relays, the Y relays, and the Z relays which are selected by the input information and the shift registers. As indicated in FIGURE 2b, there are 119 X relays, 119 Y relays, and 119 Z relays; there being one X relay, one Y relay, and one Z relay for each of the one inch intervals which can be selected. Were it not for the space limitation on the cutter bridge shown in FIGURE 1, it would not be necessary to provide the additional row sequencing circuit. In such a case, the left and right shift registers could be coupled without provision for row sequencing to all relays in accordance with the program sequencing circuit. However, since there is the space limitation on the cutter bridge, the row sequencing circuit is provided. The rows are approximately evenly divided as follows: row A is associated with the relays and cutters for the 1, 5, 9—117 inch intervals; row B is associated with the relays and cutters for the 2, 6, 10—118 inch intervals; row C is associated with the relays and cutters for the 3, 7, 11—119 inch intervals; and row D is associated with the relays and cutters for the 4, 8, 12—116 inch intervals. Thus, the flip-flops of the left and right shift registers are respectively coupled to the X, Y, and Z relays associated with particular rows. This is indicated in both FIGURES 2a and 2b. The program sequencing circuit selects one of the X, Y, or Z programs and associated relays each time a piece of material or glass leaves row D. Upon this selection, assuming the selection of an X program, all of the X relays may be activated. The particular X relays which will be activated are determined by the flip-flops in the left and right shift registers which contain index signals. If, for example, the left shift register has programmed numbers (represented by index signals) and flip-flops 19 and 40, and the right shift register has programmed numbers (represented by index signals) in flip-flops 62 and 97, then for an X program, the X relay 19 in row C will be energized, the X relay 40 in row D will be energized, the X relay 62 in row B will be energized, and the X relay 97 in row A will be energized. As the glass passes by the rows, cutters 97, 62, 19, and 40 will be operated in that order just prior to the point at which the glass reaches the respective rows. As the glass leaves each row, the cutter will be restored to make that row available for a new program. This new program will be program Y because the previous piece of glass, after leaving row D, provided the signal which transferred program selection from the X program to the Y program.

When a new program is desired, numbers are again entered on the keyboards as described. However, the previous program remains in the shift registers until an operator pushes his set push button to enter the first new number. This resets all of the flip-flops in the left and right shift registers. When this new program is completed and both shift registers are full, the program sequence circuit (having gotten the appropriate indication from row D of the row sequence circuit) then shifts the new program to the Y relays. The appropriate cutters are operated as previously described. Additional features for the control system, not shown in FIGURES 2a and 2b, are also provided as will be explained in connection with the circuits of the other figures.

*Logic background*

Because of the desirability for speed and accuracy of operation, the control system of the invention utilizes digital techniques extensively. These digital techniques include logic circuits of known elements or building blocks. There are many publications describing such elements or building blocks, one such publication being a book entitled "Design of Transistorized Circuits for Digital Computers" by A. I. Pressman, John F. Ryder Publisher, Inc., New York, 1960. This book discloses a number of actual circuits for accomplishing the various logic functions including gates, flip-flops, and counters. Persons skilled in the art will, after an explanation of the symbols shown in the figures, appreciate that many different actual circuits may be utilized to provide the respective functions indicated by the symbols. In the subsequent explanation, two logic terms will be used, these being logic 1 and logic 0. For this explanation, a logic 1 is provided by zero volts, and a logic 0 is provided by plus six volts.

Almost all of the logic symbols used are shown in FIGURE 3a. One logic symbol is a multiple (two) input NOT AND gate 10 (i.e., an AND gate with inversion at each of its inputs). In this application, as is known to those skilled in the art, this gate 10 is sometimes called a NOR gate. In logic terms, the gate 10 produces a logic 0 at its output if any one of its inputs is at a logic 1. FIGURE 3a also shows a three input NOR gate 12 and a four input NOR gate 26. These gates 12, 26 also produce a logic 0 at their outputs if any one of their inputs is at a logic 1. A two input OR NOT gate 14 (i.e., an OR gate with inversion at its output) is also shown in FIGURE 3a. This is also referred to as a NOR gate. In logic terms, the gate 14 produces a logic 0 at its output if any one of its two inputs is at a logic 1. The NOT AND and the OR NOT gates exemplified above are functionally, and may be structurally, the same. The two types of gates are shown to assist persons in applying their logic understanding to these gates. FIGURE 3a also shows a number of inverters, such as the inverter 16. The purpose of the inverter 16 is simply to reverse the logic of an applied signal. If a logic 1 is applied to the input of the inverter 16, a logic 0 is produced at its output; and if a logic 0 is applied to the input of the inverter 16, a logic 1 is produced at its output. One other type of logic gate is shown in the figures, this being an OR gate 87 shown in FIGURE 4a. The OR gate 87 produces a logic 1 at its output if either or both of its inputs are at a logic 1.

The figures also show a number of flip-flops, such as the steered flip-flop L SET–FF shown in FIGURE 3a. the flip-flop L SET–FF has its terminals labeled to assist in explanation. Outputs from the flip-flops are taken from the terminals 1 and 0. When the flip-flop is set, it is in the one state with terminal 1 at a logic 1 and terminal 0 at a logic 0. When the flip-flop is reset, it is in the zero state with terminal 1 at a logic 0 and terminal 0 at a logic 1. The flip-flop may be controlled by a number of inputs which include: a set steering input SS, a reset steering input RS, a set input SI, a reset input RI, set trigger input ST, a reset trigger input RT, and a reset trigger input T. A logic 1 applied to the set or reset inputs SI or RI sets or resets the flip-flop respectively for the duration of the logic 1, and subsequently if no further signals are applied to the flip-flop. A logic 0 at the set or reset steering input SS or RS for a predetermined time prior to a trigger pulse steers the flip-flop, and permits the flip-flop to be set or reset by a trigger pulse change from a logic 1 to a logic 0 at either the set trigger input ST or the reset trigger input RT respectively. The flip-flop remains so set or reset after removal of these signals and until further signals are applied. Finally, a reset trigger input T is provided to reset the flip-flop by a manual operation. This input T is normally at a positive voltage. The reset is accomplished by a negative voltage at the input T, followed by a return to the normal positive voltage. The location of the input and output terminals of the various flip-flops have been generally followed in all the flip-flops in the figures. Where there are omissions of flip-flop terminals in the figures, such terminals were not needed.

FIGURE 3 also shows down counter circuits such as the left down counter LDC. The down counters are given a predetermined count, and then made responsive to applied clock pulses. These clock pulses reduce the count in the counter toward zero. The down counters include a number of flip-flops. To be used, the counter must first receive a logic 1 at its input terminal SET. This sets its flip-flops. Next, information from the keyboard in terms of logic 0 is applied to the counter. Then, a transfer signal of a logic 0 is applied to the counter terminal TRF. This signal resets all the flip-flops except those selected by the input information from the keyboard. The clock pulses are being applied at all times. However, the counter is not affected until a logic 0 is applied to its count terminal. Then, as long as the count terminal is at a logic 0, the applied clock pulses reduce the count (by one for each clock pulse) in the counter. When the count is reduced to zero, the NOT 0 terminal goes from a logic 1 to a logic 0.

In the figures, an input labeled clock or clock ½ is shown. This refers to pulse signals provided by a generator (not shown) which, in the invention as utilized, is a ten kilocycle oscillator producing 10,000 pulses per second. These pulses are of such characteristic that they go from a logic 1 to a logic 0 during the pulse interval. Actually, the pulses used have 10 microseconds duration beginning every 100 microseconds. Both the clock and the clock ½ pulses occur at the same rate. However the time occurrence of any given clock pulse is midway between the time occurrences of two adjacent clock ½ pulses. This feature is used to prevent two conflicting operations from occurring at the same time.

*Input logic circuitry*

Figure 3B:
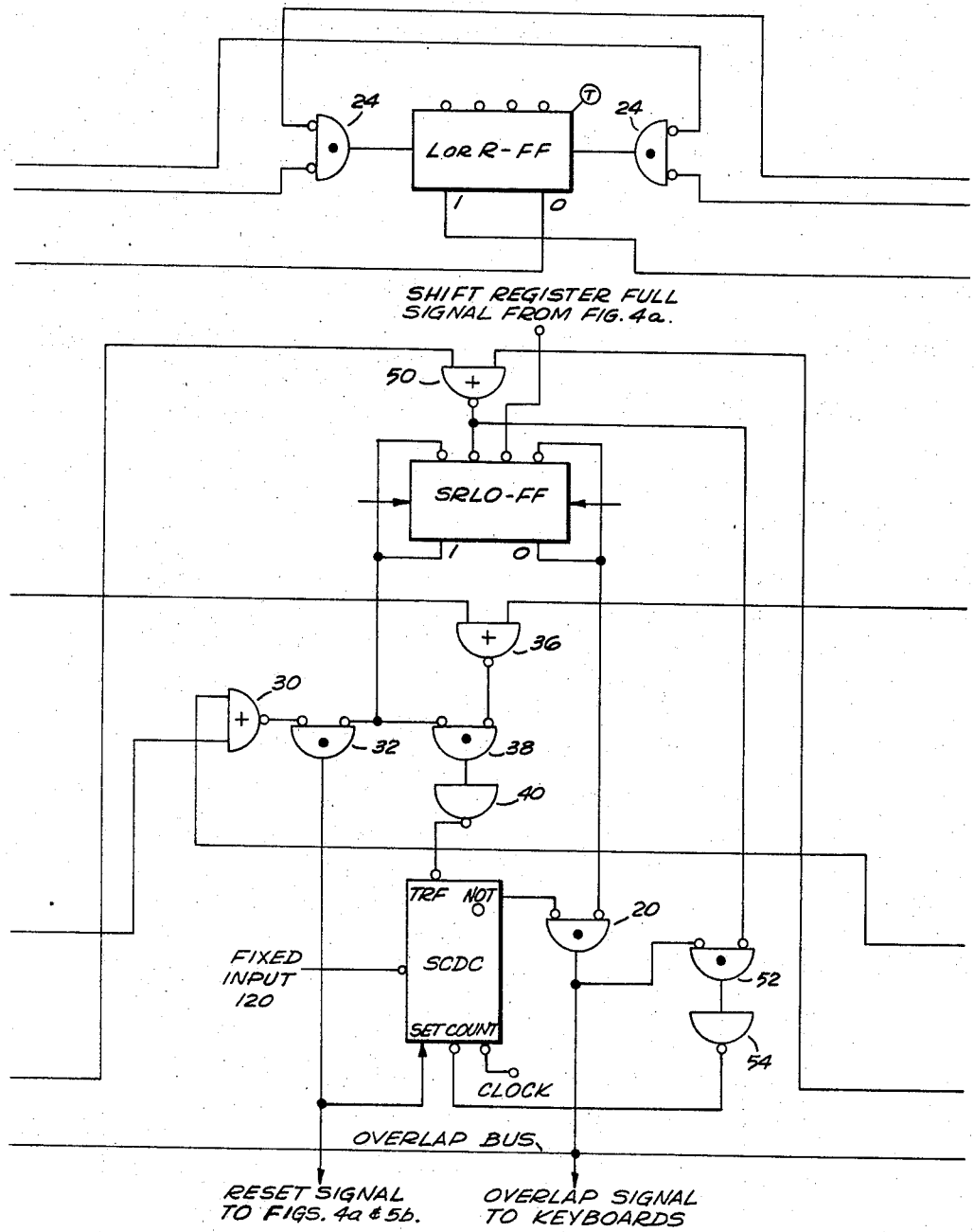
Figure 3C:
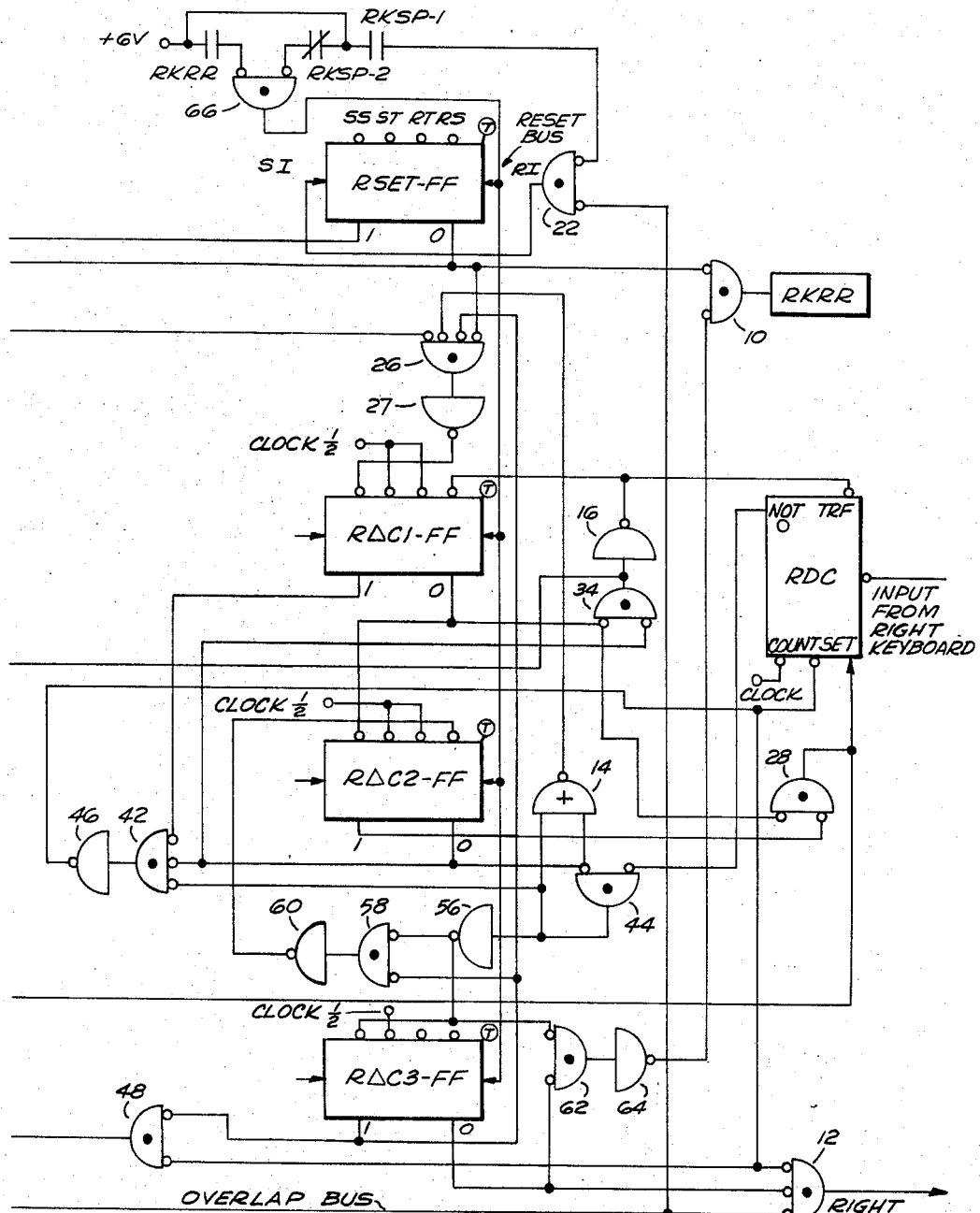

The input logic circuitry for the control system of the invention is shown in FIGURES 3a, b, and c. FIGURES 3a and c are similar, FIGURE 3a being the left operator's control system, and FIGURE 3c being the right operator's control system. The left and right systems are similar in operation, and are both coupled to the common portion of the system which is shown in FIGURE 3b. These three figures have been arranged so that connections between the figures line up or correspond. In FIGURE 3a, the left control system includes a left down counter LDC to which input information from the left keyboard is applied. The left control system also includes a left set flip-flop L SET–FF, and three incremental or delta counters LΔC1–FF, LΔC2–FF, and LΔC3–FF. The right control system includes comparable elements. The common system portion includes a left or right flip-flop L OR R–FF, a shift register lockout flip-flop SRLO–FF, and a sum check down counter SCDC.

Since the left and right control systems are similar, only one explanation will be given, this being for the left control system. The explanation also applies to the right control system. The logic table shown in FIGURE 8a may be helpful in this explanation. In this explanation, it is assumed that the Z program has just been completed, and that the system is awaiting the first of input information for a new X program and the corresponding sheet of glass. At this time, the flip-flops L SET–FF, LΔC1–FF, LΔC2–FF, and LΔC3–FF are in the reset condition. Also, the flip-flop SRLO–FF is in the reset condition with its terminal 0 at a logic 1. This logic 1 is applied to the gate 20 which produces a logic 0 on the overlap bus. This logic 0 on the overlap bus is applied to the gate 22 at the set input of the flip-flop L SET–FF. The left operator then proceeds to enter the number 19 (the first number to be entered by him as indicated in the example of FIGURE 1) by pressing the 1 pushbutton in the tens column and the 9 pushbutton in the units column. The left operator then pushes his set pushbutton which has associated contacts LKSP–1 and LKSP–2 (the abbreviation for left keyboard set pushbuttons contacts 1 and 2). The normally open contact LKSP–1 closes, and the normally closed contact LKSP–2 opens. The now closed contact LKSP–1 applies plus six volts (it will be recalled that this is at a logic 0) to the gate 22. With both inputs of the gate 22 at logic 0, a logic 1 is produced to set the flip-flop L SET–FF. Terminal 0 of this flip-flop L SET–FF goes to a logic 0 which, with the logic 0 on the terminal 1 of the flip-flop R SET–FF (in the reset condition) is applied to the gate 24. The gate 24 produces a logic 1 which sets the flip-flop L OR R–FF if it is not already set. The flip-flop L OR R–FF locks out or prevents operation of one of the left or right control systems. If the flip-flop L OR R–FF is set, only the left system is operable; if the flip-flop L OR R–FF is reset, only the right system is operable.

At this time, all four inputs to the gate 26 are at logic 0. The first input coupled to the terminal 0 of the flip-flop L SET–FF is at logic 0 because the flip-flop L SET–FF is set. The second input coupled to the terminal 1 of the LΔC3–FF is at a logic 0 because this flip-flop LΔC3–FF is reset. The third input coupled to the gate 14 is at a logic 0 because the terminal 0 of the reset flip-flop LΔC2–FF is at a logic 1. And the fourth input coupled to the terminal 0 of the flip-flop L OR R–FF is at a logic 0 because this flip-flop L OR R–FF is now set. With the four inputs at logic 0, a logic 1 is produced by the gate 26. This logic 1 is inverted to logic 0 by the inverter 27 and applied to the set steering terminal of the flip-flop LΔC1–FF. At the first clock ½ pulse, the flip-flop LΔC1–FF is set. The terminal 0 of this flip-flop LΔC1–FF goes to logic 0, this being applied to one input of the gate 28. The other input of the gate 28 is at logic 0, being coupled to terminal 1 of the reset flip-flop LΔC2–FF. The gate 28 produces a logic 1 that is the requisite set signal for the left counter LDC. This logic 1 is also applied to the gate 30 (in FIGURE 3b) which produces a logic 0. It will be recalled that the flip-flop SRLO–FF is in the reset condition so that its terminal 1 is also at a logic 0. With both inputs to the gate 32 at logic 0, the gate 32 produces a logic 1. This provides the requisite set signal for the sum check down counter SCDC. This same logic 1 also provides a reset signal which resets the shift register flip-flops in FIGURES 4a and 4b. The reset signal is also applied to the program sequencing circuit of FIGURE 5b. When a logic 1 is present, the circuit of FIGURE 5b indicates that a program is not available. Summarizing then with reference to FIGURE 8a and after the first clock ½ pulse, the flip-flop LΔC1–FF is set, the down counter LDC is set, the shift register is reset, and the sum check down counter SCDC is set.

At the second clock ½ pulse, the flip-flop LΔC2–FF is set because the terminal 0 of the now set flip-flop LΔC1–FF is at a logic 0. This provided the requisite set steering for the flip-flop LΔC2–FF. The terminals 0 of both flip-flops LΔC1–FF and LΔC2–FF are coupled to a gate 34. With these two terminals 0 at a logic 0, the gate 34 produces a logic 1 which is inverted to a logic 0 by the inverter 16 and applied to the transfer terminal TRF of the down counter LDC. This resets all flip-flops in the down counter LDC except those indicated by the input information from the left keyboard. Thus, in the example assumed, the left down counter LDC now has a count of 19. The logic 1 produced by the gate 34 is also applied to a gate 36 (in FIGURE 3b). The gate 36 therefore produces a logic 0 at its output, this being applied to a gate 38 (also in FIGURE 3b). The shift register lockout flip-flop SRLO–FF is reset so its terminal 1, coupled to the gate 38, is at a logic 0. With both inputs of the gate 38 at a logic 0, a logic 1 is produced at the output of the gate 38 which is inverted by the inverter 40 to a logic 0. This logic 0 is applied to the transfer terminal TRF of the sum check down counter SCDC. This resets all flip-flops in the sum check down counter SCDC except those indicated by the fixed input of 120. Summarizing then with reference to FIGURE 8a and after the second clock ½ pulse, the flip-flops LΔC1–FF and LΔC2–FF are set, the down counter LDC has the desired number 19 transferred into it, and the sum check down counter has the fixed input 120 applied to it.

On the third clock ½ pulse, the flip-flop LΔC1–FF is reset as a result of the logic 0 provided by the inverter 16 being applied to the reset steering input of the flip-flop LΔC1–FF. With the flip-flop LΔC1–FF in the reset condition, its terminal 1 is at a logic 0. This logic 0 is coupled to one input of the gate 42 (in FIGURE 3a). The terminal 0 of the flip-flop LΔC2–FF is at a logic 0, this being applied to the second input of the gate 42. The NOT 0 terminal of the left down counter LDC is now at a logic 1 since this counter LDC contains the desired count of 19. This logic 1 is applied to a gate 44 which produces a logic 0 at its output. This logic 0 is coupled to the third input of the gate 42. Thus, the three inputs of the gate 42 are at a logic 0 so the gate 42 produces a logic 1 at its output. This logic 1 is inverted to a logic 0 by the inverter 46. This logic 0 is applied to the count input terminal of the counter LDC so that the counter may count downward from the desired number 19 in response to clock pulses. This same logic 0 applied to the count input terminal of the counter LDC is coupled to one input of the gate 48. The other input of the gate 48 is coupled to the terminal 1 of the flip-flop LΔC3–FF which is at a logic 0. The output of the gate 48 is a logic 1 which is applied to the gate 50 (in FIGURE 3b). Tht gate 50 produces a logic 0 which is applied to one input of a gate 52 (in FIGURE 3b). The other input of the gate 52 is derived from the gate 20 (in FIGURE 3b). Since the sum check down counter SCDC now has a fixed count of 120 in it, its NOT 0 terminal is at a logic 1, this causing the gate 20 to produce a logic 0. Therefore both inputs of the gate 52 are at a logic 0 so that the gate 52 produces a logic 1. This logic 1 is inverted to a logic 0 by the inverter 54 to provide a logic 0 at the count terminal of the sum check down counter SCDC. Thus, the down counter SCDC may also begin counting down in response to clock pulses. It will be recalled that the lockout flip-flop SRLO–FF was reset. Its terminal 1 was at a logic 0 which provided a set steering input. The same logic 0 which appeared at the output of the gate 50 provided a set trigger for the flip-flop SRLO–FF and sets it. Summarizing then with reference to FIGURE 8a and after the third clock ½ pulse, the flip-flop LΔC1–FF is reset, the flip-flop LΔC2–FF is set, the flip-flop SRLO–FF is set, and the left down counter LDC and the sum check down counter SCDC are now permitted to count down in response to the clock pulses applied to the counter.

After 19 clock pulses, the sum check down counter SCDC will have counted down to 101. Its NOT 0 terminal will still be at logic 1 and no action takes place. However, the left down counter will have counted down from 19 to 0. Its NOT 0 terminal goes from a logic 1 to a logic 0. This logic 0 and the logic 0 at the terminal 0 of the flap-flop LΔC2–FF are applied to the inputs of the gate 44. The gate 44 produces a logic 1 at its output which is inverted by an inverter 56. The inverter 56 produces a logic 0 which provides set steering for the flip-flop LΔC3–FF. This flip-flop LΔC3–FF becomes set on the next clock ½ pulse. The logic 0 from the inverter 56 is also applied to one input of a gate 58. The other input of the gate 58 is at a logic 0 since it is coupled to the terminal 1 of the reset flip-flop LΔC3–FF. The gate 58 produces a logic 1 which is inverted to a logic 0 by the inverter 60. This provides reset steering at the reset steering input of the flip-flop LΔC2–FF. After the first clock ½ pulse after the first count, the flip-flop LΔC1–FF is set, the flip-flop LΔC2–FF is reset, and the flip-flop LΔC3–FF is set. With the flip-flop LΔC1–FF set and the flip-flop LΔC2–FF reset, the same condition exists as existed after the first clock ½ pulse before the first count. Note FIGURE 8a. Summarizing then with reference to FIGURE 8a and after the first clock ½ pulse after the first count, the flip-flop LΔC1–FF is set, the flip-flop LΔC2–FF is reset, the down counter LDC is again set, and the flip-flop LΔC3–FF is set. At this point, it should be noted that the lockout flip-flop SRLO–FF is set to produce a logic 0 at the set terminal of the sum check down counter SCDC to hold that counter in its present condition. The flip-flop LΔC3–FF is also set, this putting a logic 0 on the second input of the left enable gate 12.

After the second clock ½ pulse after the first count, and in a manner similar to the second clock ½ pulse before the first count, the keyboard information is again transferred to the down counter LDC. The three flip-flops LΔC1–FF, LΔC2–FF, and LΔC3–FF are set. At this point, the left down counter LDC again has its input information of 19. After the third clock ½ pulse after the first count, the left down counter LDC is again permitted to count down. The flip-flop LΔC1–FF is reset. Now all inputs to the enable gate 12 are at a logic 0. This is accomplished as follows: The first input of the gate 12 is coupled through the inverter 46 to the gate 42. The first input of the gate 42 is coupled to the terminal 1 of the reset flip-flop LΔC1–FF which is now at a logic 0; the second input of the gate 42 is coupled to the terminal 0 of the set flip-flop LΔC2–FF which is at a logic 0; and the third input of the gate 42 is coupled to the output of the gate 44 which is at a logic 0 because the NOT 0 terminal of the down counter LDC is at a logic 1. All inputs of the gate 42 are at logic 0 so that the gate 42 produces a logic 1 which is inverted by the inverter 46 and applied as a logic 0 to the first input of the enable gate 12. The second input of the enable gate 12 is coupled to the terminal 0 of the set flip-flop LΔC3–FF which is at a logic 0. The third input of the enable gate 12 is coupled to the overlap bus which, as long as there is a count present in the sum check down counter SCDC, is at a logic 0. This is because the NOT 0 terminal of the sum check down counter SCDC is at a logic 1 which, when applied to the gate 20 produces a logic 0 on the overlap bus. Thus, a left enable signal is provided, this signal being utilized to make the left shift register operative. The operation of this shift register will be explained subsequently.

After the third clock ½ pulse, the count down takes place in the left down counter LDC and, as a result of the enable signal, in the left shift register of FIGURE 4a. Previously, after the third clock ½ pulse, the count down took place in the left down counter LDC and in the sum check down counter SCDC. When the left down counter LDC reaches zero, its NOT 0 terminal goes to a logic 0. This logic 0 and the logic 0 provided by the terminal 0 of the set flip-flop LΔC2–FF are applied to the gate 44. The gate 44 produces a logic 1 at its output which is inverted by the inverter 56 to a logic 0. This logic 0 is applied to one input of the gate 62. The other input to the gate 62 is derived from the terminal 0 of the set flip-flop LΔC3–FF. This terminal 0 is at a logic 0. Therefore the gate 62 produces a logic 1 which is inverted to a logic 0 by the inverter 64. This logic 0 and the logic 0 provided by the terminal 0 of the set flip-flop L SET–FF are applied to the gate 10 to produce a logic 1 at its output. This logic 1 operates the left keyboard reset relay LKRR. When the reset relay LKRR is operated, its associated contact LKRR–1 closes to provide a logic 0 (plus six volts) at one input of the gate 66. With the contact LKSP–2 in its normally closed condition, both inputs to the gate 66 are at a logic 0 and the gate 66 produces a logic 1 at its output. This resets all the left control system flip-flops by means of the reset bus. With these flip-flops so reset, the left system is again ready for a second input of a program.

Another input may be applied to either the left or right system in the manner just described. For this second input, the same sequence of events indicated in FIGURE 8a takes place. However, the shift register is not reset, and the sum check down counter SCDC does not receive a new count of 120. This is because the lockout flip-flop SRLO–FF is now set. When set, its terminal 1 causes the gate 32 to produce a logic 0. This logic 0 prevents a new setting of the sum check down counter SCDC, and prevents the shift registers from being reset.

Either the left or right operator may apply input information to the control system in the manner described. He (assume the left operator) does this by entering the input information on the keyboard and then depressing the set pushbutton. If the other (right) operator has depressed his set pushbutton, no delay is noticed by the left operator because the sequence described above takes place in a few milliseconds. This is because of the high clock pulse rate. After this sequence, and usually before the left operator has released his set pushbutton, the information entered on the keyboard by the left operator is set into the control system.

If, during entry of input information in a given program, the sum check down counter SCDC has its count of 120 reduced to 0 (either because of an excessive entry or because of an operator entering an input that will use all the available 120 inches of glass), its NOT 0 terminal goes to logic 0. This logic 0 and the logic 0 on the terminal 0 of the set flip-flop SRLO–FF cause the gate 20 to produce a logic 1. This logic 1 can be used to provide an overlap signal on the keyboards. The logic 1 stops the enable signal at the enable gate 12 so that the shift register is stopped at this point. This is not undesirable if the inspectors place numbers on the glass which utilize the full 120 inches. However, it may mean that one desired width of glass will not be obtained.

*Shift register storage circuits*

Figure 4B:
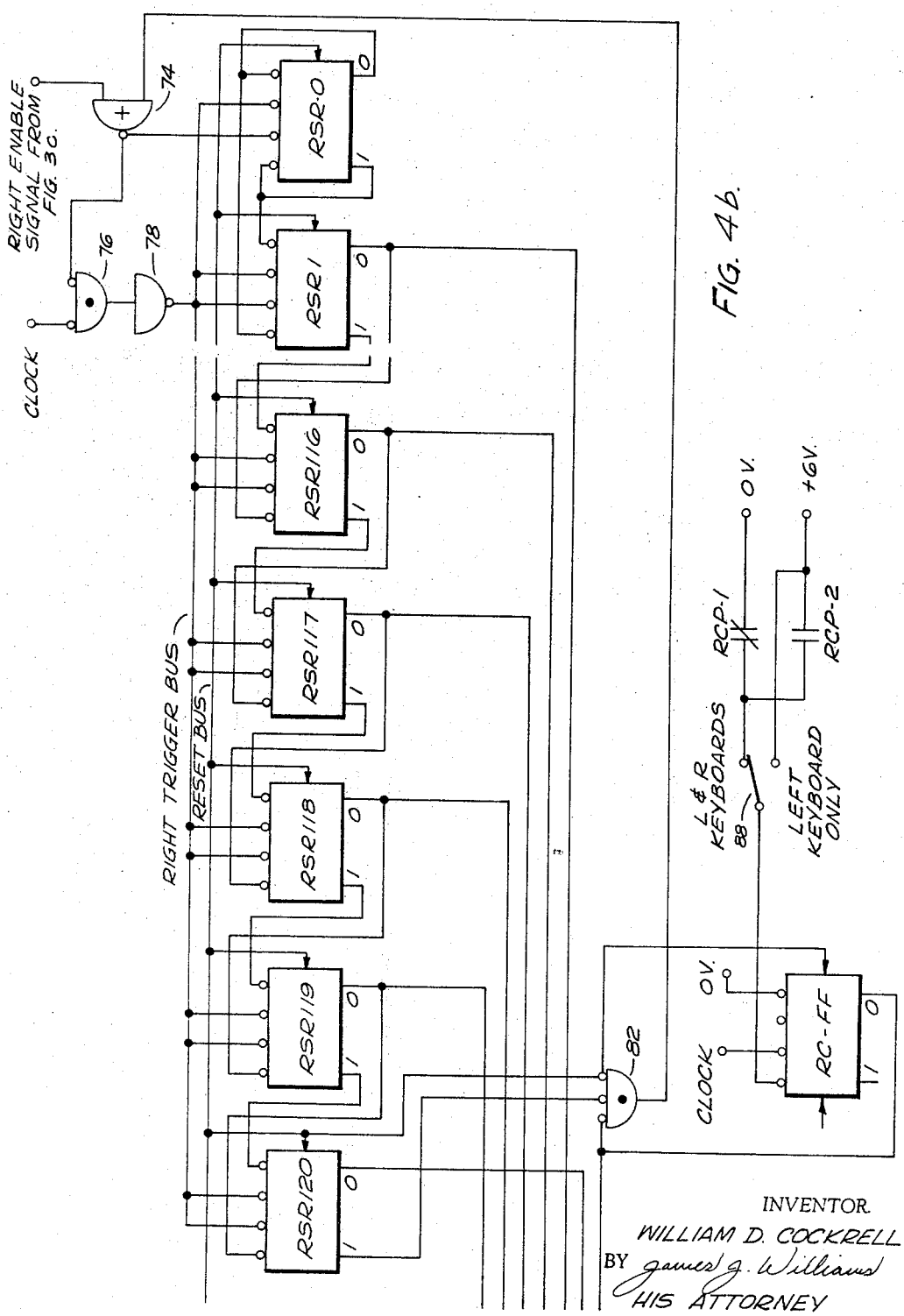

FIGURES 4a and 4b show the left and right shift register storage circuits for the control system. These figures have been arranged so that connections between the figures line up or correspond. Each of these storage circuits includes 121 flip-flops numbered from 0 through 120 inclusive. Because of space limitations, only flip-flops 0, 1, 116,

117, 118, 119, and 120 have been shown. It is to be understood, however, that flip-flops 2 through 115 would be coupled into the circuit in the indicated space between flip-flops 1 and 116. The left shift register storage circuit receives index signals at flip-flop 120 which set flip-flop LSR 120. Subsequent clock pulses move these index signals toward the flip-flop LSR 0. The right shift register storage circuit receives index signals at flip-flop RSR 0 which set flip-flop RSR 0. Subsequent clock pulses move these index signals toward the flip-flop RSR 120. The clock pulses are passed to the shift registers by respective enable signals from the control circuits of FIGURES 3a and c. The number of clock pulses passed determines the number of flip-flops through which the index signals are moved. In both shift register storage circuits, the terminal 0 of the flip-flops 1 through 119 are respectively coupled to one input of left transfer gates and right transfer gates. The other inputs of these gates are coupled through a normally closed shift register transfer relay contact SRTR 1 to a source of zero volts (logic 1). The other inputs are also coupled through a normally open contact SRTR–2 to a source of plus six volts (logic 0). The left and right flip-flops are intercoupled so that an index signal is indicated in a flip-flop by that flip-flop being set. The index signals are placed in the left shift register at flip-flop 120, and may be moved toward flip-flop 0 at the rate of one flip-flop per clock pulse. The index signals are placed in the right shift register at flip-flop 0, and may be moved toward flip-flop 120 at the rate of one flip-flop per clock pulse. All index signals in a shift register move simultaneously when clock pulses are passed.

The explanation of the shift register storage circuits will be given using the example shown in FIGURE 1. In this example, the left operator begins the new program by entering the number 19 and hitting his set push button. All flip-flops will be reset by the reset signal from FIGURE 3b which is applied to the reset bus. When reset, all of the flip-flops have terminal 1 at logic 0 and terminal 0 at logic 1. Then the input logic circuitry of FIGURES 3a, 3b, and 3c goes through its function and produces a left enable signal (logic 1) after a clock ½ pulse. This signal is applied to a gate 68 which produces a logic 0 at its output. The other input of the gate 68 is at logic 0 because the flip-flops LC–FF and RC–FF are reset and respectively apply a logic 1 to the gates 80, 82. The logic 0 produced by the gate 106 provides a set trigger signal for the flip-flop LSR 120. Since this flip-flop LSR 120 was reset, its terminal 1 was at logic 0 to provide set steering. Thus, the enable signal sets flip-flop LSR 120. The set flip-flop LSR 120 thus has the initial index signal. This logic 0 from the gate 68 is applied to a gate 70 which permits the clock pulses to pass through the gate 70. Thus gate 70 produces a logic 1 at its output in response to each clock pulse. The inverter 72 inverts this logic 1 to a logic 0. The output of the inverter 72 is applied to the left trigger bus which is connected to both the set trigger and reset trigger inputs of the flip-flops LSR 0 through LSR 119, and to the reset trigger input of the flip-flop LSR 120. The first clock pulse (after the clock ½ pulse which produced the enable signal) resets the flip-flop LSR 120 because terminal 0 of this flip-flop LSR 120 provides the requisite logic 0 reset steering at the reset steering input of the flip-flop 120. The terminal 0 of the flip-flop LSR 120 also provides the requisite logic 0 set steering at the set steering input of the flip-flop LSR 119. Therefore the first clock pulse resets the flip-flop LSR 120 and sets the flip-flop LSR 119. It will thus be seen that the initial index signal (formerly present in the flip-flop LSR 120 which was set) has been transferred to the flip-flop LSR 119, which is now set. The flip-flop LSR 120 is reset at the same time. The next clock pulse transfers the index signal from the flip-flop LSR 119 to the flip-flop LSR 118, and resets the flip-flop LSR 119 at the same time. If it is recalled that 19 clock pulses are permitted by the enable signal from the circuits of FIGURES 3a, b. and c, it will be seen that the initial index signal in the flip-flop LSR 120 will, during this enable signal, be transferred to the flip-flop LSR 101. At this time, the left enable signal will return to a logic 0 which effectively closes the gate 70 so that clock pulses do not reach the left trigger bus.

Again with reference to the example shown in FIGURE 1, assume that the right operator then enters the number 23 and hits his set pushbutton. The right control system of FIGURE 3c and the common circuit portion of FIGURE 3b will provide an enable signal for 23 clock pulses by means of the gates 74, 76 and the inverter 78. This places an initial index signal in the flip-flop RSR 0 and transfers this initial index signal to the flip-flop RSR 23. Next assume that the left operator enters the number 21 and hits his set pushbutton. This places a second index signal in the flip-flop LSR 120 and transfers this second index signal to the flip-flop LSR 99. It also transfers the initial index signal from the flip-flop LSR 101 to the flip-flop LSR 80. Next assume that the right operator enters the number 35 and hits his set pushbutton. This places a second index signal in the flip-flop RSR 0 and transfers this second index signal to the flip-flop RSR 35. It also transfers the initial signal from the flip-flop RSR 23 to the flip-flop RSR 58. At this point, the sum check down counter SCDC has counted down 120 minus, 19, minus 23, minus 21, and minus 35, and has a count of 22 remaining. If the left operator then attempts to enter the number 22 (or any larger number), the sum check down counter SCDC will produce a logic 1 on the overlap bus. A logic 1 on the overlap bus causes the enable gate 12 (FIGURE 3a) to produce a logic 0 which is applied to one input of the gate 68. The other input is at logic 0, so the gate 68 produces a logic 1. This logic 1 prevents the gate 70 from passing clock pulses. Thus, this last number 22 is not entered into the shift registers. However, as will be pointed out, the last number 35 entered by the right operator will produce a cut on the glass that will produce the desired 22-inch piece. Hence, no loss or mistake will occur.

With the numbers 19 and 21 entered by the left operator into the left shift register, and with the numbers 23 and 35 entered by the right operator in the right shift register, the following flip-flops are set and have an index signal: LSR 80, LSR 99, RSR 35, and RSR 58. Both the left and right operators may then hit their respective complete pushbuttons which have associated left complete pushbutton contacts LCP–1 and LCP–2, and right complete pushbutton contacts RCP–1 and RCP–2. When these contacts are operated, zero volts (logic 1) are removed from the left and right complete flip-flops LC–FF and RC–FF, and plus six volts (logic 0) are applied to the set steering input of these flip-flops. On the next clock ½ pulse, these flip-flops LC–FF and RC–FF become set. Their terminal 0 provides a logic 0 to the gates 80, 82. The inner inputs of the gates 80, 82 are respectively coupled to the terminal 1 of the flip-flops LSR 0 and RSR 120 which, at this moment, are at a logic 0. The last inputs of the gates 80, 82 are coupled to the reset bus which, at this time, is at a logic 0. Therefore, the gates 80, 82 each produce a logic 1. The left enable gate 68 and the right enable gate 74 each produce a logic 0 that sets the flip-flops LSR 120 and RSR 0 to provide them with final index signals. This logic 0 is also applied to the gates 70, 76. The gates 70, 76 are permissive and clock pulses appear on the left trigger bus and the right trigger bus. This causes the flip-flops in the left and right shift registers to respectively move all their index signals toward the flip-flop LSR 0 and toward the flip-flop RSR 120. When the initial index signals respectively reach these flip-flops LSR 0 and RSR 120, they become respectively set with their terminal 1 as a logic 1. Each logic 1 is respectively applied to the gates 80, 82 to cause these gates 80, 82 to each produce a logic 0 at the gates 68, 74. The enable signals are now at logic 0. The gates 68, 74 each produce a logic 1 at the respective gates 70, 76.

Therefore, the gates 70, 76 permit no more clock pulses to reach the left and right shift registers. Each terminal 0 of the last flop-flops LSR 0 and RSR 120 apply a logic 0 to the gate 84. And each terminal 0 of flip-flops LC–FF and RS–FF apply a logic 0 to the gate 84. The gate 84 produces a logic 1 which is inverted to a logic 0 by the inverter 86. This is the shift register full signal that is applied to the common control circuit of FIGURE 3b to reset the flip-flop SRLO–FF, and which is also applied to the program sequencing circuit of FIGURE 5a.

In FIGURE 4b, a switch 88 is provided for enabling the left keyboard only to enter numbers, or for enabling both the left and right keyboards to enter numbers. This switch is shown on the keyboard of FIGURE 1. If the switch 88 is in the position shown, then both the left and right complete push buttons LCP and RCP are operative. However, if the switch 88 is moved to its down position, then only the left complete push button LCP is operative.

When the shift registers are full and the initial index signals have respectively reached the flip-flop LSR 0 and the flip-flop RSR 120, the shift register full signal is provided. In this condition, the left shift register flip-flops LSR 0, LSR 19, and LSR 40 are set or contain index signals; and the right shift register flip-flops RSR 120, RSR 97, and RSR 62 are set or contain index signals. At this point, it will be appreciated that if the left operator had entered his final number of 22, this would have been indicated by an index signal in the flip-flop LSR 62. The index signal in the flip-flop RSR 62 accomplishes the same function. This corresponds to the example assumed and shown in FIGURE 1. These set flip-flops are used to energize respective transistors of the same number for operating the cutter relays as will be explained.

As will be subsequently explained, a shift register transfer signal is received from FIGURE 4a to energize the shift register transfer relay SRT and operate its associated contacts SRTR–1 and SRTR–2. This opens the normally closed contact SRTR–1, thus removing the zero volts (logic 1) from the left transfer gates and the right transfer gates and applying plus six volts (logic 0) to these gates. This renders the left transfer gates and the right transfer gates operative. The left transfer gates and the right transfer gates coupled to a respective left and right shift register flip-flop which is in the set condition (indicating an index signal) will produce a logic 1. It will be be noted that corresponding left transfer gates and right transfer gates are respectively coupled to common left and right transfer gates so that if either one of a corresponding left transfer gate or a right transfer gate produces a logic 1, the corresponding left and right transfer gate will produce a logic 1 output which is applied to a transistor. For example, after the shift registers have been filled and the initial index signals run to the end flip-flops, if the flip-flop LSR 119 is in the set condition, the left transfer gate 85 produces a logic 1 which is applied to the left and right transfer gate 87. The gate 87 produces a logic 0 for application to the transistor 119. In the same way, if the flip-flop RSR 119 were in the set condition, the right transfer gate 89 would produce a logic 1 output which is applied to the left and right transfer gate 87. The gate 87 would produce a logic 0 signal for application to the transistor 119. Thus, either the left or the right flip-flop of any given number may be set to produce a signal to energize its corresponding transistor. As will be explained, those transistors which are energized are utilized to operate relay circuitry for operating a particular cutter.

*Program sequencing circuit*

In the control system for the glass cutter, it was desirable that three programs of storage be provided so that programs could be stored ahead. In accordance with the invention, this is accomplished by three programs designated the X program, the Y program, and the Z program. Each of these three programs has an associated set of relays for each of the 119 transistors and 119 cutters. The program sequencing circuit of the invention is shown in FIGURES 5a and b. These figures have been arranged so that connections between the figures line up or correspond. This sequencing circuit includes two flip-flops PGM–FF1 and PGM–FF2. These two flip-flops PGM–FF1 and PGM–FF2 are sequenced by the shift register full signal from the shift register circuit of 4a in various set and reset combinations, a particular combination determining a particular program. The program sequencing circuit also includes two additional flip-flops SQ–FF1 and SQ–FF2 which provide a sequence of four time intervals for each program. These intervals are provided to give the relays time to pick up and assume a stable condition in response to signals from the shift registers and transistors. The sequencing flip-flops SQ–FF1 and SQ–FF2 operate in connection with a timing circuit which utilizes two monostable multivibrators T–FF1 and T–FF2 to provide four 50 milliseconds timing intervals for a program. Other timing intervals may be used. The program sequencing circuit also includes hold and pickup flip-flops for each of the three programs. These include X, Y, and Z hold flip-flops HX–FF, HY–FF, and HZ–FF, and pickup flip-flops PX–FF, P–FF, and PZ–FF. These flip-flops provide a pickup signal for the program relays and a hold signal for the program relays.

The particular program used is determined by the set and reset combination of the program flip-flops PGM–FF1 and PGM–FF2. The logic table of FIGURE 8b shows the combinations of these two flip-flops for the programs. These flip-flops PGM–FF1 and PGM–FF2 respond to the log 0 shift register full signal from the inverter 86 in FIGURE 4a. The sequencing of the two program flip-flops PGM–FF1 and PGM–FF2 will be explained in connection with the logic table of FIGURE 8b. At the beginning, it is assumed that the Z program has been used so that both flip-flops PGM–FF1 and PGM–FF2 are reset. With both flip-flops reset, each terminal 1 is at a logic 0 which, when applied to the gate 90, produces a logic 1. This logic 1 is inverted by the inverter 92 to produce a logic 0 at the set steering input of flip-flop PGM–FF1. At this time, the shift register full flip-flop SRF–FF is reset, but set steering is provided at its set steering input, as will be explained. With this set steering, when the shift register full signal of logic 0 is received, the flip-flop SRF–FF becomes set and its terminal 1 becomes a logic 1. The flip-flop SRF–FF is reset by the next clock pulse because its terminal 0 provides reset steering during the time it is set. And during the time the flip-flop SRF–FF is set, the logic 1 on terminal 1 is applied to the gate 94 which produces a logic 0 on the program shift bus. The flip-flop PGM–FF1 becomes set, and its terminal 0 becomes a logic 0. This terminal 0 is coupled to the X bus, and when at logic 0, the X bus is permissive. The flip-flop PGM–FF1 provides itself with reset steering and also provides the flip-flop PGM–FF2 with set steering. When the next shift register full signal appears on the program shift bus, the flip-flop PGM–FF1 is reset and the flip-flop PGM–FF2 is set. The terminal 0 of the set flip flop PGM–FF2 now provides a logic 0 on the Y bus which is then permissive. The flip-flop PGM–FF2 provides itself with reset steering so that when the next shift register full signal appears on the program shift bus, the flip-flop PGM–FF2 is reset. At this point, both flip-flops PGM–FF1 and PGM–FF2 are again reset. As previously explained, a logic 0 is provided by the inverter 92 so that the Z bus is permissive. With the flip-flops PGM–FF1 and PGM–FF2 both reset, the circuit is back at the initial condition assumed at the beginning of this explanation. When the next shift register full signal is received, the flip-flop PGM–FF1 will again be set so as to make the X bus permissive. This sequence continues in response to shift register full signals.

Each time the program shift bus responds to the shift register full signal and sequences the flip-flops PGM–FF1 and PGM-FF2, it also starts a sequence of four timing intervals by the sequencing flip-flops SQ-FF1 and SQ-FF2, and the associated timing flip-flops T-FF1 and T-FF2. The timing flip-flops T-FF1 and T-FF2 are monostable multivibrator circuits which, in the particular application of the control system, were arranged to provide a 50 milliseconds timing interval for each sequencing combination of the flip-flops SQ-FF1 and SQ-FF2. The sequencing of these two flip-flops, and the functions accomplished, are shown in the logic table of FIGURE 8c. In their normal or stable condition, the timing flip-flops T-FF1 and T-FF2 are in the set condition so that each respective terminal 0 is at a logic 0. In the unstable or timing period, each respective terminal 0 becomes a logic 1 for the predetermined time interval determined by the timing circuit elements of the flip-flop. The flip-flop T-FF1 was designed to have a timing interval of 10 milliseconds and the flip-flop T-FF2 was designed to have a timing interval of 40 milliseconds. When the gate 96 produces a logic 1, the flip-flop T-FF1 is reset. Its terminal 0 goes to logic 1 for 10 milliseconds, after which the flip-flop T-FF1 sets itself again. When it becomes set, its terminal 0 goes to logic 0 which is inverted by the inverter 98. The inverter 98 supplies a logic 1 reset signal to the reset input of the flip-flop T-FF2. The flip-flop T-FF2 is then reset for 40 milliseconds, after which its terminal 0 again returns to a logic 0. This terminal 0 is coupled to the gate 96. If the upper input of the gate 96 is at a logic 0, another reset signal is again provided by the gate 96 to the reset input terminal of the flip-flop T-FF1. The sequence repeats itself at 50-millisecond intervals as long as the upper input of the gate 96 is at logic 0. The upper input of the gate 96 will be at logic 0 if either of the flip-flops SQ-FF1 or SQ-FF2 is set. One reason that two timing flip-flops T-FF1 and T-FF2 were used was so that a very sharp logic 0 pulse would be provided at the terminal 0 of the flip-flop T-FF2 at precisely the 50 milliseconds interval. This facilitated the design and operation of the remainder of the control system.

The terminal 0 of the timing flip-flop T-FF2 is also coupled to the reset trigger input of the sequencing flip-flop SQ-FF1, and to both the set and reset trigger inputs of the flip-flop SQ-FF2. The logic 0 pulses at 50 milliseconds intervals at this terminal 0 cause the sequencing flip-flops SQ-FF1 and SQ-FF2 to go through their sequence (also at 50-millisecond intervals). This sequence is indicated in the logic table of FIGURE 8c. The explanation of this sequence follows. First, assume that the sequencing flip-flops SQ-FF1 and SQ-FF2 are reset. The flip-flop SQ-FF1 provides itself with set steering. When a logic 0 appears on shift bus (in response to a shift register full signal), the flip-flop SQ-FF1 is set. Its terminal 1 goes to a logic 1 which, when applied to the gate 100, produces a logic 0 at the output of the gate 100. This logic 0 is applied to the gate 96 along with the logic 0 from the terminal 0 of the timing flip-flop T-FF2. The gate 96 thus produces a logic 1 at its output which causes the timing flip-flops T-FF1 and T-FF2 to start their 50 milliseconds timing interval. During the first 50 milliseconds timing interval, the sequence flip-flop SQ-FF1 is set and the sequence flip-flop SQ-FF2 is reset. The terminal 0 of the flip-flop SQ-FF1 and the terminal 1 of the flip-flop SQ-FF2 are both at a logic 0. The gate 102 produces a logic 1 which is inverted by the inverter 104 to a logic 0. This logic 0 makes the hold and pickup bus permissive, and also makes the gates 106, 110, 114 coupled to this bus permissive. During this first 50 milliseconds interval, assume that the program sequencing flip-flops PGM-FF1 and PGM-FF2 are respectively set and reset so that the X bus is permissive. Under this condition, only the gate 106 coupled to the X bus and to the hold and pickup bus has both its inputs at a logic 0 so that only this gate 106 produces a logic 1 at its output. This logic 1 is applied to the set input terminals of the hold and pickup X program flip-flops HX-FF and PX-FF to set both of these flip-flops. When these flip-flops HX-FF and PX-FF are set, they provide signals to energize the hold and pickup relays HX and PX. Summarizing with reference to the logic table of FIGURE 8c, in the first 50 milliseconds interval after the reset condition, the sequencing flip-flops SQ-FF1 and SQ-FF2 energize the hold and pickup relays of one of the programs, in this case the X program.

At the end of this first 50 milliseconds interval, the timing flip-flop T-FF2 is again set so that its terminal 0 returns to a logic 0. This logic 0 is applied to the set and reset trigger inputs of the sequencing flip-flop SQ-FF2, which at this time has a logic 0 applied to its set steering input by the terminal 0 of the sequencing flip-flop SQ-FF1. This causes the flip-flop SQ-FF2 to become set. The return to logic 0 by the terminal 0 of the flip-flop T-FF2 causes the gate 96 to produce another logic 1 at the reset input of the flip-flop T-FF1 to start the second 50 milliseconds timing interval. During this second interval, both flip-flops SQ-FF1 and SQ-FF2 are set. Each terminal 0 of these flip-flops is coupled to the gate 118 so the gate 118 produces a logic 1 which is inverted by the inverter 120 to a logic 0 at one input of the gate 122. The other input of the gate 122 is at a logic 0, since it is coupled through the skip push button to plus six volts (logic 0). The gate 122 produces a logic 1 which serves as the shift register transfer signal that operates the relay SRT of FIGURE 4a. This relay SRT transfers the information from the left and right shift register flip-flops to the transistors. Summarizing with reference to FIGURE 8c, in the second 50 milliseconds timing interval, the shift register transfer relay SRT is operated.

At the end of this second interval, the flip-flop T-FF2 is again set. Its terminal 0 supplies a logic 0 to the reset trigger input of the flip-flop SQ-FF1. This flip-flop SQ-FF1 has a logic 0 at its reset steering input which is provided by the terminal 0 of the flip-flop SQ-FF2. Therefore, at the beginning of the third 50 milliseconds interval, the flip-flop SQ-FF1 is reset, and the flip-flop SQ-FF2 is set. The terminal 1 of the flip-flop SQ-FF1 is at a logic 0 which is applied to the gate 124 along with the logic 0 from the terminal 0 of the set flip-flop SQ-FF2. The gate 124 produces a logic 1 at its output which is inverted by the inverter 126 to produce a logic 0 on the dropout bus. This dropout bus is coupled to the gates 108, 112, 116. It will be recalled that the X program was assumed to be utilized. Therefore, the X bus is at a logic 0, and this logic 0 coupled to an input of the gate 108 with the logic 0 on the dropout bus coupled to the gate 108. So the gate 108 produces a logic 1 at its output. This logic 1 is applied to the reset input terminal of the X program pickup flip-flop PX-FF. This resets the flip-flop PX-FF so that its terminal 0 becomes a logic 1. This deenergizes the X program pickup relay utilized in FIGURE 7a. Also when the flip-flops SQ-FF1 and SQ-FF2 are reset and set respectively, the terminal 0 of the flip-flop SQ-FF1 is at a logic 1 which produces a logic 0 at the output of the gate 118, this being inverted to a logic 1 at the output of the inverter 120. This logic 1 is applied to the gate 122 to remove the shift register transfer signal. Summarizing with reference to FIGURE 8c, in the third 50 milliseconds time interval, the dropout bus has been made permissive, and the shift register transfer signal has been removed.

At the end of the third interval, the flip-flop T-FF2 is again set. The terminal 0 of the set flip-flop SQ-FF2 provides reset steering for the flip-flop SQ-FF2. When the flip-flop T-FF2 becomes set, its terminal 0 produces a logic 0 which resets the flip-flop SQ-FF2. Thus, during the fourth 50 milliseconds interval, the flip-flops SQ-FF1 and SQ-FF2 are reset. At the end of this fourth 50 milliseconds interval, the timing flip-flop T-FF2 becomes set. This does not start another timing interval because each terminal 1 of the flip-flops SQ-FF1 and SQ-FF2 are at logic 0. The gate 100 produces a logic 1, which when applied to the gate 96, produces a logic 0 on the reset input of the flip-flop T-FF1. Thus, the flip-flop T-FF1 cannot be reset in its timing condition. Nothing further happens until a shift register full signal is received to cause a logic 0 to appear on the program shift bus. At this time the flip-flops PGM–FF1 and PGM–FF2 have a new program combination. The flip-flops SQ–FF1 and SQ–FF2 are operated through four more timing intervals as just described. In summary then, it will be seen that during a given program and sequence of four timed intervals of 50 milliseconds, the pickup and hold flip-flops for a given program, say the X program flip-flops PX–FF and HX–FF, are set to provide pickup and hold signals in the first interval; a shift register transfer signal is provided in the second interval; the pickup flip-flop for the same program (hence the flip-flop PX–FF) is reset to remove the pickup signal, and the shift register transfer signal is removed in the third interval; and the interval sequencing circuit is reset in the fourth interval.

The output of the gate 100 is inverted by an inverter 128 and applied to a gate 130. Each time that both the sequence flip-flops SQ–FF1 and SQ–FF2 are reset, the gate 100 produces a logic 1 which is inverted to a logic 0 and applied to the gate 130. A logic 0 at the other input of the gate 130 produces a logic 1 that is inverted to a logic 0 by an inverter 132 and applied to the set steering input of the flip-flop SRF–FF. This set steering input to the flip-flop SRF–FF permits the shift register full signal to initiate a new program. The other input to the gate 130 is derived from a gate 134. This gate 134 provides a logic 0 at its output at any time one of three gates 136, 138, 140 produces a logic 1. Any one of these three gates 136, 138, 140 produces a logic 1 if any program hold flip-flop, say the flip-flop HX–FF is reset and if the previously used program, in this assumption the Z program, is indicated by the program flip-flops PGM–FF1 and PGM–FF2 being in the proper set-reset condition. In other words, the shift register full flip-flop SRF–FF receives set steering if the program flip-flops PGM–FF1 and PGM–FF2 are conditioned for a particular program and if the hold and pickup flip-flops for the subsequent program are reset.

The output of the inverter 132 is also coupled to one input of a gate 142. The other input of the gate 142 is coupled to the skip and repeat push button circuit, and is normally coupled to zero volts (logic 1). The gate 142 normally provides a logic 0 which is inverted by an inverter 144 to a logic 1 and applied to the set steering input of the repeat and set flip-flop R AND S–FF. The reset steering input of the flip-flop R AND S–FF is normally coupled to plus six volts (logic 0) through the skip and repeat push buttons so that this flip-flop R AND FF normally has reset steering and is normally reset. The skip pushbutton is provided on the left keyboard so that no cuts are made on a sheet of glass, but that the information of the program is retained in the shift registers. The skip pushbutton normally provides a logic 0 to the shift register gate 122 so that a shift register signal may be provided. However, if the skip pushbutton is depressed, this logic 0 is removed from the gate 122 and zero volts (logic 1) are applied through the repeat push button to the gate 122 to prevent shift register signals from being provided. At the same time that this skip pushbutton is depressed, it closes the contacts between plus six volts (logic 0) and the gate 142. If the other input to the gate 142 is at a logic 0, a logic 1 is provided and inverted by the inverter 142 to provide set steering for the flip-flop R AND S–FF. On the next clock pulse, this flip-flop R AND S–FF is set. Its terminal 1 becomes a logic 1 which produces a logic 0 at the output of the gate 94. This logic 0 serves as a trigger for the program flip-flops PGM–FF1 and PGM–FF2 and also for the sequence flip-flop SQ–FF1. This causes the next program to be utilized. However, the gate 122 can not provide a shift register transfer signal during the second timed interval because the upper input of the gate 122 is at logic 1. Therefore the information in the shift registers is not transferred to the relays. As soon as the skip pushbutton is released, the plus six volts (logic 0) are again coupled to the reset steering input of the flip-flop R AND S–FF and the next clock pulse resets this flip-flop. A logic 0 is also again applied to the gate 122 so that during the next sequence of timed intervals, the information in the shift registers may, if desired, be transferred to the relays.

The repeat push button is also located on the left keyboard. When depressed, this push button removes the plus six volts (logic 0) from the reset steering input of the flip-flop R AND S–FF and applies the plus six volts (logic 0) to the gate 142. As described in the preceding paragraph, the flip-flop R AND S–FF is set. This causes the next program to be utilized. In this case, the skip push button is closed and provides plus six volts (logic 0) to the gate 122 so that a shift register transfer signal may be provided to transfer information in the shift registers to the relays. When the repeat push button is released, the flip-flop R AND S–FF again becomes reset. Thus, it will be seen that the program sequence circuit permits information in the shift registers to be skipped or repeated for as many programs as desired without losing the information in the shift registers.

FIGURE 5b includes a gate 146 which has its inputs coupled to each terminal 0 of the X, Y, and Z program hold flip-flops HX–FF, HY–FF, and HZ–FF. If any one of these flip-flops is reset, its terminal 0 is at a logic 1 and this produces a logic 0 at the input of a gate 148. If the circuit of FIGURE 3b has produced a reset signal, the gate 148 provides a signal which indicates (in the program open light on the keyboards) that a program is now available and that the operator may proceed to enter information in a new program.

*Row sequencing circuit*

The row sequencing circuit of the control system is provided because, as shown in FIGURE 1, it was necessary that the cutters be positioned in rows because of space limitations. The row sequencing circuit is sequenced by mechanical limit switches. There is a front and a rear limit switch for each row on both sides of the cutter bridge. The location of the cutters for each row is indicated by the dashed and dotted lines, and the location of the limit switches is indicated by the dashed lines. Thus, in row A there is a front limit switch LSA–F and a rear limit switch LSA–R. Both front and rear limit switches for each row are operated by the presence of glass and dropped out by the absence of glass. A front and rear switch for each row provides an added time margin. In order to insure that proper operation is obtained, similar limit switches were placed on both sides of the cutter bridge for the front and rear of each row to take care of any canted or improperly positioned glass. The contacts of the switches are indicated by a number suffix. Thus the front limit switch for row A has a contact LSA–F1 and LSA–F2, these being the left and right contacts. Similar designations have been used for the other switches. The row sequencing circuit uses the material or glass to cause the sequencing, so that it is necessary that this sequencing be coordinated with the proper program. And because of the necessity of the rows of cutters, the glass had to have a minimum length along its direction of motion. If the spacing along the direction of glass motion between corresponding limit switches of two adjacent rows is designated S, and if the spacing between the front and rear limit switches in a row is designated $d$, then the length of the glass along its direction of motion should be at least equal to or greater than $S+d$, and the space between adjacent pieces of glass should be at least equal to or greater than the distance $d$. This is indicated in the drawing at the top of FIGURES 6a and b. This drawing shows a side view of the conveyor with the limit switches and the spacings mentioned. The direction of the conveyor is also indicated. FIGURES 6a and b have been arranged so that connections between or elements common to the figures line up or correspond.

The row sequencing circuit includes flip-flops coupled to the limit switches to produce a sharp pulse in response to operation of the limit switches. The row sequencing circuit also includes a flip-flop for each row and for each program. Thus, for the X program there are flip-flops AX–FF, BX–FF, CX–FF, and DX–FF. These flip-flops are coupled to the limit switches so that as the glass moves along past the limit switches, the flip-flops of a given program are set as the glass enters the row and are reset as the glass leaves the row. The row sequencing circuit includes row sequencing flip-flops ROW–FF1 and ROW–FF2, the conditions of these flip-flops determining the program which is to be used. Therefore, it is essential that there be coordination between the row sequencing circuit and the program sequencing circuit. This is achieved by an initial reset condition of the system and will continue. Before a sheet of glass arrives, it will be noted that the front limit switch flip-flops AF–FF, BF–FF, CF–FF, and DF–FF are reset, and that the rear limit switch flip-flops AR–FF, BR–FF, CR–FF, and DR–FF are set. The row sequence flip-flops ROW–FF1 and ROW–FF2 are reset. When the leading edge of a sheet of glass enters the A row, the limit switch LSA–F is operated. Its contacts set the flip-flop AF–FF. Both inputs of the gate 150 coupled to each terminal 1 of the flip-flops ROW–FF1 and ROW–FF2 are at logic 0. The gate 150 produces a logic 1 which is inverted by the inverter 152 to provide set steering for the flip-flop ROW–FF1. When the flip-flop AF–FF is set, its terminal 0 goes to a logic 0 to provide a trigger signal that sets the flip-flop ROW–FF1. As indicated in FIGURE 8d the set flip-flop ROW–FF1 and the reset flip-flop ROW–FF2 indicates the X program. The X program becomes operative as follows: When the terminal 0 of the flip-flop ROW–FF1 goes to a logic 0, this logic 0 provides a set trigger to the flip-flop AX–FF which was previously reset and which therefore provided itself with set steering. (When the flip-flop AX–FF is set, it provides itself with reset steering.) While the flip-flop AX–FF is set, it produces a logic 0 on its terminal 0 which is coupled to and operates the AX relays. This logic 0 also provides set steering for the flip-flop BX–FF. When the flip-flop ROW–FF1 is set, the flip-flops AY–FF and AZ–FF do not become set. This is because the flip-flop AY–FF does not receive a set trigger pulse from the terminal 0 of the reset flip-flop ROW–FF2, and because the flip-flop AZ–FF does not now receive a set trigger pulse from the inverter 152.

As the glass continues to move, it engages the limit switch LSA–R whose contacts reset the flip-flop AR–FF. This performs no function at this time.

As the glass continues to move, it engages the limit switch LSB–F whose contacts set the flip-flop BF–FF. This flip-flop BF–FF being set provides a set trigger to the flip-flop BX–FF (which had set steering). The flip-flop BX–FF is set and operates the BX relays, and provides set steering for the flip-flop CX–FF.

As the glass continues to move, it engages the limit switch LSB–R whose contacts reset the flip-flop BR–FF. This performs no function at this time.

Assume that the length of the glass is such that its rear edge now leaves the limit switch LSA–F. Its contacts reset the flip-flop AF–FF, but this does not affect the flip-flops ROW–FF1 and ROW–FF2. Next, the rear edge of the glass leaves the limit switch LSA–R. This sets the flip-flop AR–FF. The terminal 0 of the flip-flop AR–FF provides a reset trigger to the flip-flop AX–FF (which was previously set and provided itself with reset steering), and resets the flip-flop AX–FF. When the flip-flop AX–FF is reset, the AX relays are deenergized. The AX relays were operated when the leading edge of the glass engaged the front limit switch LSA–F and deenergized when the trailing edge of the glass left the rear limit switch LSA–R.

Next, the leading edge of the glass engages the limit switch LSC–F which operates the CX relays. Then the trailing edge leaves the limit switch LSB–R which deenergizes the BX relays. The DX relays are then operated, followed by the CX and then the DX relays being deenergized. In other words, the leading edge of the glass sets the flip-flops AX–FF, BX–FF, CX–FF, and DX–FF (and operates the relays) as it engages the front limit switch of each of the rows, and the trailing edge of the glass resets these flip-flops (and deenergizes the relays) as it leaves the rear limit switch of the same comparable rows. Each time any one of the row D flip-flops DX–FF or DY–FF or DZ–FF is set, it provides a logic 1 at its terminal 1 which is used to reset the hold flip-flops HX–FF or HY–FF or HZ–FF respectively in FIGURE 5b. If the limit switches are provided slightly ahead of and behind each row of cutters, there will be a margin of operation ahead of the cutters and a margin of operation subsequent to the time the glass leaves the cutters.

When the next piece of glass appears, the sequence is repeated, but this time the row flip-flops ROW–FF1 and ROW–FF2 cause the Y program to be sequenced through. The sequencing continuous in response to each piece of glass, the program being coordinated with the program selected by the program sequence circuit.

*Cutter relay circuits*

FIGURES 7a and b show the cutter relay circuits for the system. These figures have been arranged so that connections between the figures line up or correspond. These circuits include 119 transistors whose base electrodes are coupled to the left and right transfer gates of the shift register circuit of FIGURE 4a. Each of the transistors may be of the PNP type and may have its emitter coupled to a source of positive D.C. voltage B+. The collector of each transistor is coupled to three relays, an X program relay, a Y prorgam relay, and a Z program relay. These relays are indicated by the program followed by a number. Thus, the transistor 119 has its collector coupled to the relay XR–119, the relay YR–119, and the relay ZR–119. A pair of pickup contacts, indicated by the relay number and dash 1, couples each program relay to a respective pickup bus and transistor. A second pair of hold contacts, indicated by the relay number and dash 2, couples each program relay to a respective hold bus and to the source B+. The pickup and hold buses are coupled to a negative source of D.C. potential B— through pickup and hold relay contacts. These relays are operated by respective pickup and hold flip-flops of the program sequencing circuit of FIGURE 5b. Thus in a program, if either the left or right shift register flip-flops LSR–119 or RSR–119 is set, when the shift register transfer relay is energized, the left and right transfer gate 87 associated with the flip-flops 119 produces a logic 1 (zero volts) which is coupled to the base of the transistor 119. This logic 1 causes the transistor 119 to conduct. At the same time this shift register transfer takes place, the program sequencing circuit causes the X or Y or Z program to be activated. If the active program is the X program, the hold relay HX and the pickup relay PX are energized. The contacts PXR–1 and HXR–1 connect the source B— to the pickup and hold buses. There is a current path from the source B+ through the emitter-collector path of transistor 119, through the upper contact XR–119–1, through the relay XR–119, through the lower contact XR–119–1, the pickup X bus, the closed contact PXR–1 to the source B—. This current energizes the relay XR–119 which closes its own contacts XR–119–2 (and a little later opens its contacts XR–119–1) so that a current path is provided from the source B+ through the upper contact XR–119–2, through the relay XR–119, through the lower contact XR–119–2, the hold X bus, closed contact HXR–1 to the source B—. Thus the relay XR–119 holds itself in through current flow from the source B+ through the upper and lower contacts XR–119–2, the hold X bus, the contacts HXR–1 to the source of potential B—. It will be recalled that the pickup and hold timing interval is 50 milliseconds, this being sufficiently long for the XR relays, the YR relays, and the ZR relays to pick up and seal themselves in. After so sealing themselves in, these relays no longer need to rely on the signals from the shift registers. And, in fact, the third timing interval of the programming sequence removes the pickup signal so that the pickup relays are available for a new program.

Figure 6B:
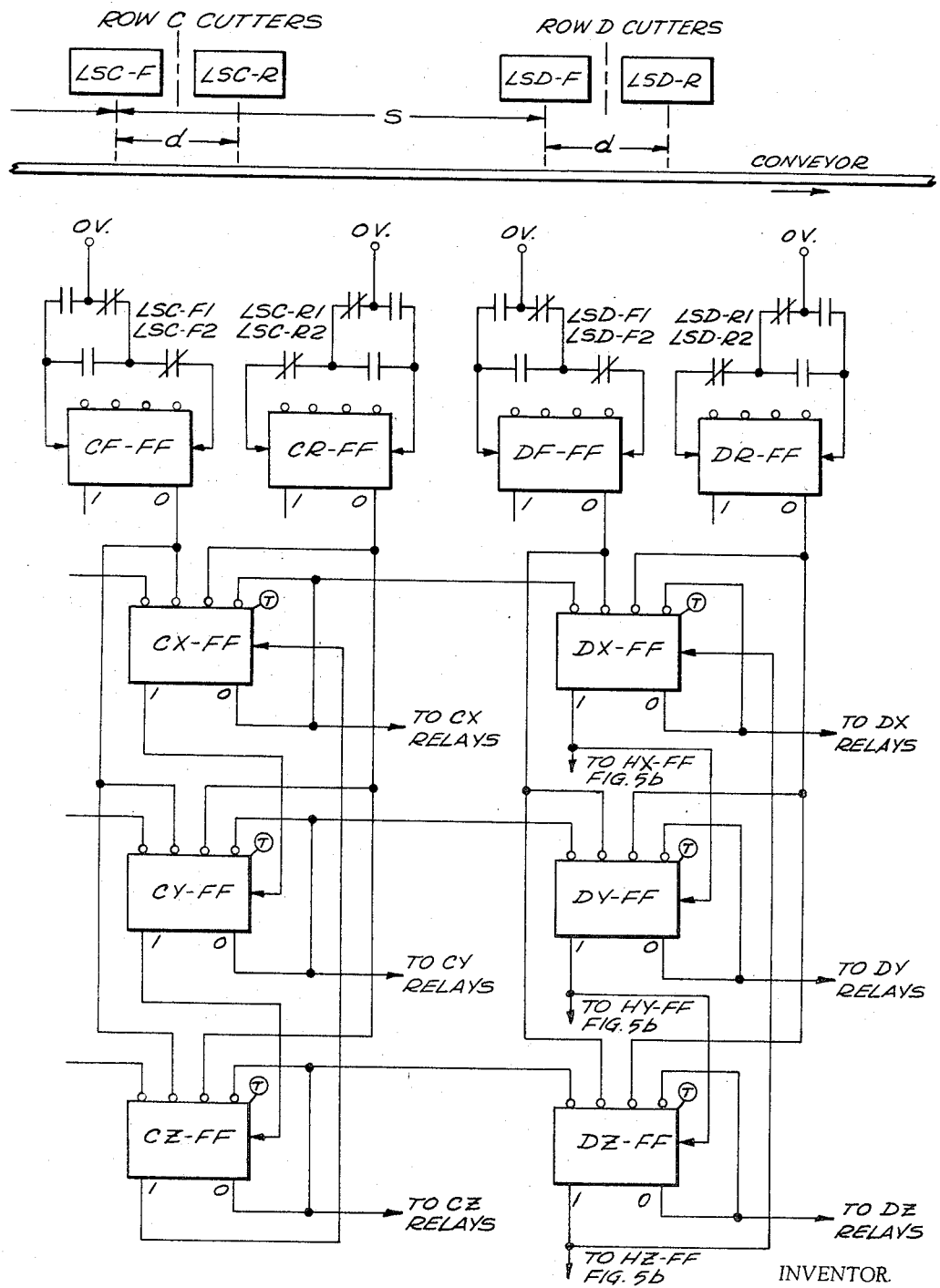

As seen in the lower part of FIGURES 7a and b, the X, Y, and Z relays have a third set of associated contacts. These contacts are indicated by contact designations XR, YR, and ZR followed by a number, followed by a dash 3. A corresponding set of row contacts associated with a particular program is respectively coupled in series with these contacts. These row contacts are indicated by a row designation, a program designation, a number (and it will be recalled that a particular number is in only one particular row), and a dash 1. These row contacts associated with the A, B, C, and D rows of relays are operated by the row sequencing circuit of FIGURES 6a and 6b. Thus, it will be seen that any cutter relay indicated by the legend CR followed by a number may be operated only if the proper program relay and the proper row relay are operated. The operation of these cutter relays CR operates the cutters which mark or scribe the glass as it moves beneath the cutter bridge. Thus, in order for a particular cutter to be operated, it is necessary that the proper relay from one of the X, Y, or Z programs be operated and that the proper row relay associated with that program also be operated. This insures coordination between the programs and the pieces of glass. If this coordination is lost for some reason, it can be restored by hitting the clear system push button on the left keyboard. This resets all necessary flip-flops in the system so that new programs of information can be entered.

Conclusion

The control system of the invention provides a new and improved control system that enables devices to be operated in accordance with a desired program of information and in accordance with row sequencing. The control system insures that the desired program is checked for proper operation before the devices are operated. Further, the system permits two or more shift registers, in this case the left and right shift registers, to be coupled to a common storage system. And finally, the system provides coordinated operation between programs and rows of devices. While the invention has been described with reference to particular embodiments, it is to be understood that modifications may be made by persons skilled in the art without departing from the spirit of the invention or from the scope of the claims.

What I claim as new and desire to secure by Letters Patent of the United States is:

1. A system for controlling the operation of N selectively operable devices comprising first and second input devices for generating first and second input signals indicative of the operable device to be operated, a checking circuit coupled to said first and second input devices, said checking circuit having means for being provided with signals of a predetermined magnitude, means for applying given input signals in said first or second input device to said checking circuit and reducing the magnitude of said predetermined signals in said checking circuit by the magnitude of said given input information, first and second shift registers respectively coupled to said first and second input devices, said shift registers each having N stages, said stages indicating said input signals by a set condition, means responsive to said predetermined signals in said checking circuit being greater than zero after said reduction, for respective applying said first and second signals to said first and second shift registers and setting said stages corresponding to said input signals, a combined storage device having N stages respectively coupled to corresponding stages of both said first and second shift registers, means for indicating said input signals in said stages of said combined storage device in response to a set condition of the correponding stage of said first and second shift registers, and means coupled to said combined storage device for respectively operating said operable devices in response to indications in said combined storage device.

2. A system for controlling the operation of N selectively operable devices in accordance with one of a plurality of programs comprising first and second input devices for generating first and second input signals indicative of the operable device to be operated, a checking circuit coupled to said first and second input devices, said checking circuit having means for being provided with signals of a predetermined magnitude, means for applying given input signals in either of said first and second input devices to said checking circuit and reducing the magnitude of said predetermined signals in said checking circuit by the magnitude of said given input signals, first and second shift registers respectively coupled to said first and second input devices, said shift registers each having N stages, said stages indicating said input signals by a set condition, means responsive to said predetermined signals in said checking circuit being greater than zero after said reduction, for respectively applying said first and second signals to said first and second shift registers and setting said stages corresponding to said input signals, a combined storage device having N stages respectively coupled to corresponding stages of both said first and second shift registers, means for indicating said input signals in said stages of said combined storage device in response to a set condition of the corresponding stage of said first and second shift registers, and means coupled to said combined storage device for operating said operable devices in response to one of said programs and in response to indications in said combined storage device.

3. A system for controlling the operation of a plurality of N selectively operable devices arranged in a plurality of rows comprising first and second input devices for generating first and second input signals indicative of the operable device to be operated, a checking circuit coupled to said first and second input devices, said checking circuit having means for being provided with signals of a predtermined magnitude, means for applying given input signals in either of said first and second input devices to said checking circuit and reducing the magnitude of said predetermined signals in said checking circuit by the magnitude of said given input signals, first and second shift registers respectively coupled to said first and second input devices, said shift registers each having N stages, said stages indicating said input signals by a set condition, means responsive to said predetermined signals in said checking circuit being greater than zero after said reduction, for respectively applying said first and second signals to said first and second shift registers and setting said stages corresponding to said input signals, a combined storage device having N stages respectively coupled to corresponding stage of both said first and second shift registers, means for indicating said input signals in said stages of said combined storage device in response to a set condition of the corresponding stage of said first and second shift registers, and means coupled to said combined storage device for operating said operable devices row by row in response to indications in said combined storage device.

4. A system for controlling the operation of N selectively operable devices in accordance with one of a plurality of programs, said devices being arranged in a plurality of rows, comprising first and second input devices for generating first and second input signals indicative of the operable device to be operated, a checking circuit coupled to said first and second input devices, said checking circuit having means for being provided with signals of a predetermined magnitude, means for applying given input signals in either of said first and second input devices to said checking circuit and reducing the magnitude of said predetermined signals in said checking circuit by the magnitude of said given input signals, first and second shift registers respectively coupled to said first and second input devices, said shift registers each having N stages, said stages indicating said input signals by a set condition, means responsive to said predetermined signals in said checking circuit being greater than zero after said reduction, for respectively applying said first and second signals to said first and second shift registers and setting said stages corresponding to said input signals, a combined storage device having N stages respectively coupled to corresponding stages of both said first and second shift registers, means for indicating said input signals in said stages of said combined storage device in response to a set condition of the corresponding stage of said first and second shift registers, and means coupled to said combined storage device for operating said operable devices row by row in response to one of said programs and in response to indications in said combined storage device.

5. An apparatus for scoring a glass sheet in continuous movement along a line, including control means for selectively operating a plurality of selected glass scoring means disposed at progressively spaced intervals in a line parallel to the leading edge of said glass sheet and extending between the side edges of the glass sheet, said control means including an input device for serially generating pulse signals representative of the selected glass scoring means; a checking device, having predetermined total maximum allowable input pulse signal information for each glass sheet, coupled to said input device; an information storage device, for storing information respective the selected glass scoring means to be operated, coupled to said input device; means for first applying said pulse signals to said checking device; means responsive to said pulse signals in the aggregate not exceeding the maximum allowable by said checking device for applying said pulse signals to said information storage device; means for sensing the approach of the leading edge of said glass sheet; and means for bringing said glass scoring means into contact with a flat surface of said glass sheet responsive to said means for sensing the approach of the leading edge of said glass sheet and the information in said information storage device.

6. Apparatus as defined in claim 5 including input overlap sensing means, said overlap sensing means being coupled to said checking means and being responsive to signals exceeding said maximum allowable input pulse signal information to provide an overlap signal.

7. Apparatus as defined in claim 6 and wherein said checking means comprises a down counter.

8. An apparatus for scoring a glass sheet in continuous movement along a line including control means for selectively operating a plurality of selected glass scoring means disposed at progressively spaced intervals in a plurality of lines paralel so the leading edge of said glass sheet and extending between the side edges of the glass sheet, said control means including an input device for serially generating pulse signals representative of the selected glass scoring means; a checking device, having predetermined total maximum allowable input pulse signal information for each shet, coupled to said input device; means for first applying said pulse signals to said checking device; means, responsive to said pulse signals applied to said checking device in the aggregate not exceeding the maximum allowable, for applying said pulse signals to said information storage device; means for sensing the approach of the leading edge of said glass sheet to each line of said glass scoring means; and means for bringing said selected scoring means in said plurality of lines, respectively, into contact with the flat surface of said glass sheet responsive to said means for sensing the approach of the leading edge of said glass sheet to each respective line and the information in said information storage device.

9. Apparatus as defined in claim 8 including input overlap sensing means, said overlap sensing means being coupled to said checking means and being responsive to signals exceeding said maximum allowable input pulse signal information to provide an overlap signal.

10. Apparatus as defined in claim 9 and wherein said checking means comprises a down counter.

11. An appartus for scoring a glass sheet in continuous movement along a line, including control means for selectively operating a plurality of selected glass scoring means disposed at progressively spaced intervals in a line parallel to the leading edge of said glass sheet and extending between the side edges of the glass sheet, said control means including first input device and a second input device, each including means for serially generating pulse signals representative of the selected glass scoring means; a checking device, having predetermined total maximum allowable input pulse signal information for each glass sheet, coupled to said input devices; an information storage device, for storing information respective the selected glass scoring means to be operated, coupled to said input device; means for first applying said pulse signals from said first and second input devices to said checking device; means responsive to said respective pulse signals in the aggregate not exceeding the maximum allowable by said checking device for applying said pulse signals to said information storage device; means for sensing the approach of the leading edge of said glass sheet; and means for bringing said glass scoring means into contact with a flat surface of said glass sheet responsive to said means for sensing the approach of the leading edge of said glass sheet and the information in said information storage device.

12. Appartus as defined in claim 11 including input overlap sensing means, said overalp sensing means being coupled to said checking means and being responsive to signals exceeding said maximum allowable input pulse signal information to provide an overlap signal.

13. Apparatus as defined in claim 11 including means operative at said first input device for preventing the coupling of pulse information from said second input device to said checking device while pulses are being transmitted from said first input device to said checking means and means operative at said second input device for preventing the coupling of pulse information from said first input device to said checking device while pulses are being transmitted from said second input device to said checking means.

14. An apparatus for scoring a glass sheet in continuous movement along a line including control means for selectively operating a plurality of selected glass scoring means disposed at progressively spaced intervals in a plurality of lines parallel so the leading edge of said glass sheet and extending between the side edges of the glass sheet, said control means including a first input device and a second input device, each including means for serially generating pulse signals representative of the selected glass scoring means; a checking device, having predetermined total maximum allowable input pulse signal information for each sheet, coupled to said input device; means for first applying said pulse signals from said first and second input means to said checking device; means, responsive to said respective pulse signals applied to said checking device in the aggregate not exceeding the maximum allowable, for applying said pulse signals to said information storage device; means for sensing the approach of the leading edge of said glass sheet to each line of said glass scoring means; and means for bringing said selected scoring means in said plurality of lines, respectively into contact with a flat surface of said glass sheet responsive to said means for sensing the approach of the leading edge of said glass sheet to each respective line and the information in said information storage device.

15. Apparatus as defined in claim 14 including input overlap sensing means, said overlap sensing means being coupled to said checking means and being responsive to signals exceeding said maximum allowable input pulse signal information to provide an overlap signal.

16. Apparatus as defined in claim 14 including means operative at said first input device for preventing the coupling of pulse information from said second input device to said checking device while pulses are being transmitted from said first input device to said checking means and means operative at said second input device for preventing the coupling of pulse information from said first input device to said checking device while pulses are being transmitted from said second input device to said checking means.

References Cited

UNITED STATES PATENTS

| | | | |
|---|---|---|---|
| 2,753,503 | 7/1956 | Wideroe | 235—150.1 X |
| 2,913,179 | 11/1959 | Gordon | 235—150.3 |
| 3,079,079 | 2/1963 | Phister et al. | 235—150.1 |
| 3,191,857 | 6/1965 | Galey et al. | 83—71 X |
| 3,201,572 | 8/1965 | Yetter | 235—151 |
| 3,205,740 | 9/1965 | Groves et al. | 235—151.13 |
| 3,246,550 | 4/1966 | Galey et al. | 83—71 |
| 3,274,390 | 9/1966 | Umbel | 250—219 |

MALCOLM A. MORRISON, *Primary Examiner.*

K. W. DOBYNS, M. P. HARTMAN,
*Assistant Examiners.*